(12) United States Patent (10) Patent No.: US 11,925,149 B2
Nickerson et al. (45) Date of Patent: Mar. 12, 2024

(54) AUTO-DETECTION OF DEVICES ON A MULTI-WIRE IRRIGATION CONTROL SYSTEM AND AUTO-ASSIGNMENT OF RECEIVERS TO IRRIGATION ZONES

(71) Applicant: Rain Bird Corporation, Azusa, CA (US)

(72) Inventors: Harvey J. Nickerson, El Cajon, CA (US); Larry J. Martin, Colorado Springs, CO (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 17/744,148

(22) Filed: May 13, 2022

(65) Prior Publication Data

US 2022/0361426 A1 Nov. 17, 2022

Related U.S. Application Data

(60) Provisional application No. 63/188,997, filed on May 14, 2021.

(51) Int. Cl.
*A01G 25/16* (2006.01)
*G05B 19/042* (2006.01)
*H04L 61/00* (2022.01)

(52) U.S. Cl.
CPC ......... *A01G 25/167* (2013.01); *A01G 25/165* (2013.01); *G05B 19/0423* (2013.01); *H04L 61/00* (2013.01); *G05B 2219/2625* (2013.01)

(58) Field of Classification Search
CPC .... A01G 25/167; A01G 25/165; A01G 25/16; G05B 19/0423; G05B 2219/2625; H04L 61/00; H04L 61/5038
See application file for complete search history.

(56) References Cited

U.S. PATENT DOCUMENTS 4,007,458 A * 2/1977 Hollabaugh ............. H04Q 9/14
340/9.1
4,176,395 A * 11/1979 Evelyn-Veere ........ G05D 22/02
239/69

(Continued)

OTHER PUBLICATIONS

PCT; App. No. PCT/US2022/029229; International Search Report and Written Opinion dated Aug. 16, 2022; (60 pages).

(Continued)

*Primary Examiner* — Chad G Erdman
(74) *Attorney, Agent, or Firm* — Fitch, Even, Tabin & Flannery LLP

(57) ABSTRACT

In some embodiments, apparatuses and methods are provided herein useful to use with irrigation devices connected to a multi-wire path in an irrigation system. In some embodiments, there is provided a system for use with irrigation devices including a modulator configured to provide an output power signal modulated with data; a multi-wire interface coupled to the modulator and configured to electrically couple to the multi-wire path extending into a landscape and to which the irrigation devices are connected; and a control circuit configured to execute an automated device discovery process configured to cause the modulator to modulate data comprising a discovery message on the output power signal, the discovery message indicating a portion of an address to match and prompting a response from one or more of the irrigation devices in which a corresponding portion of the unique address matches the portion of the address to match.

34 Claims, 28 Drawing Sheets

(56) References Cited

U.S. PATENT DOCUMENTS

| | | |
|---|---|---|
| 7,756,917 B2 | 7/2010 | Dehart |
| 8,260,465 B2 | 9/2012 | Crist |
| 11,229,168 B2 | 1/2022 | Woytowitz |
| 2002/0019725 A1* | 2/2002 | Petite ................. G05B 23/0208 |
| | | 702/188 |
| 2003/0097482 A1 | 5/2003 | Dehart |
| 2011/0015800 A1 | 1/2011 | Crist |
| 2013/0306749 A1 | 11/2013 | O'Brien |
| 2014/0129039 A1 | 5/2014 | Olive-Chahinian |
| 2018/0212792 A1* | 7/2018 | Brandt .............. H04W 52/0219 |
| 2019/0032294 A1* | 1/2019 | Christiansen ......... H01F 7/1844 |
| 2020/0100440 A1 | 4/2020 | Micu |
| 2022/0051237 A1 | 2/2022 | Karpenko |
| 2022/0154847 A1 | 5/2022 | Nøhr Christiansen |

OTHER PUBLICATIONS

Baseline Inc.; "Base Station 3200"; 2010; Baseline Inc.; Meridian, ID USA; pp. 1-82.

* cited by examiner

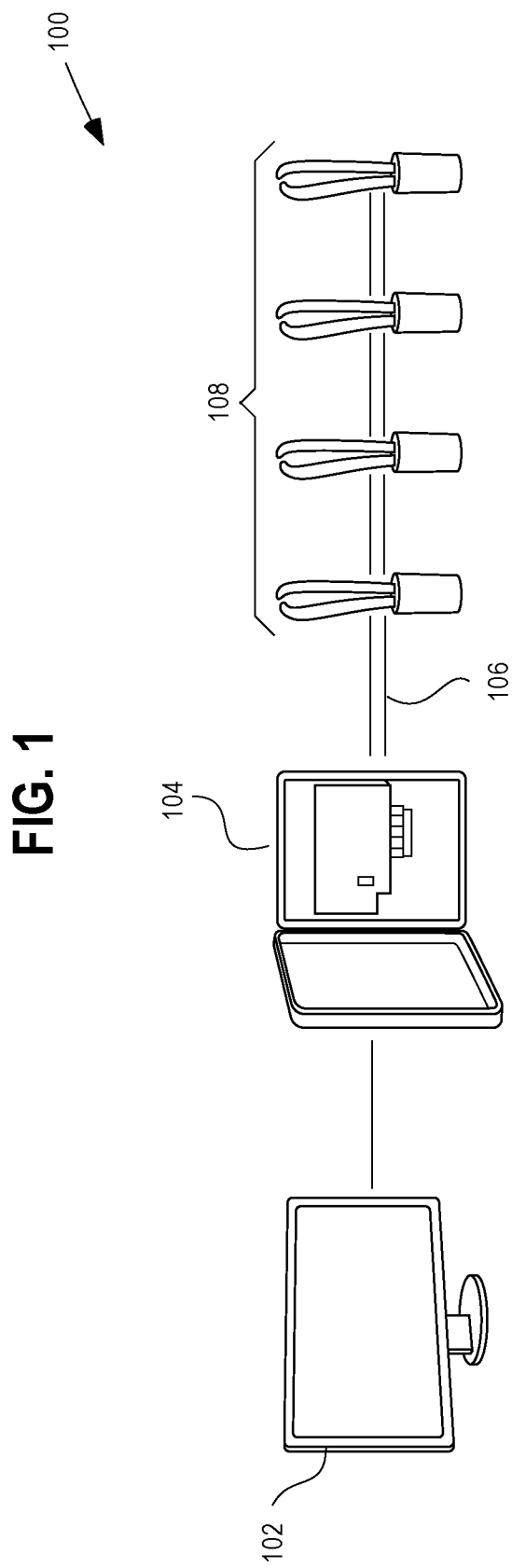

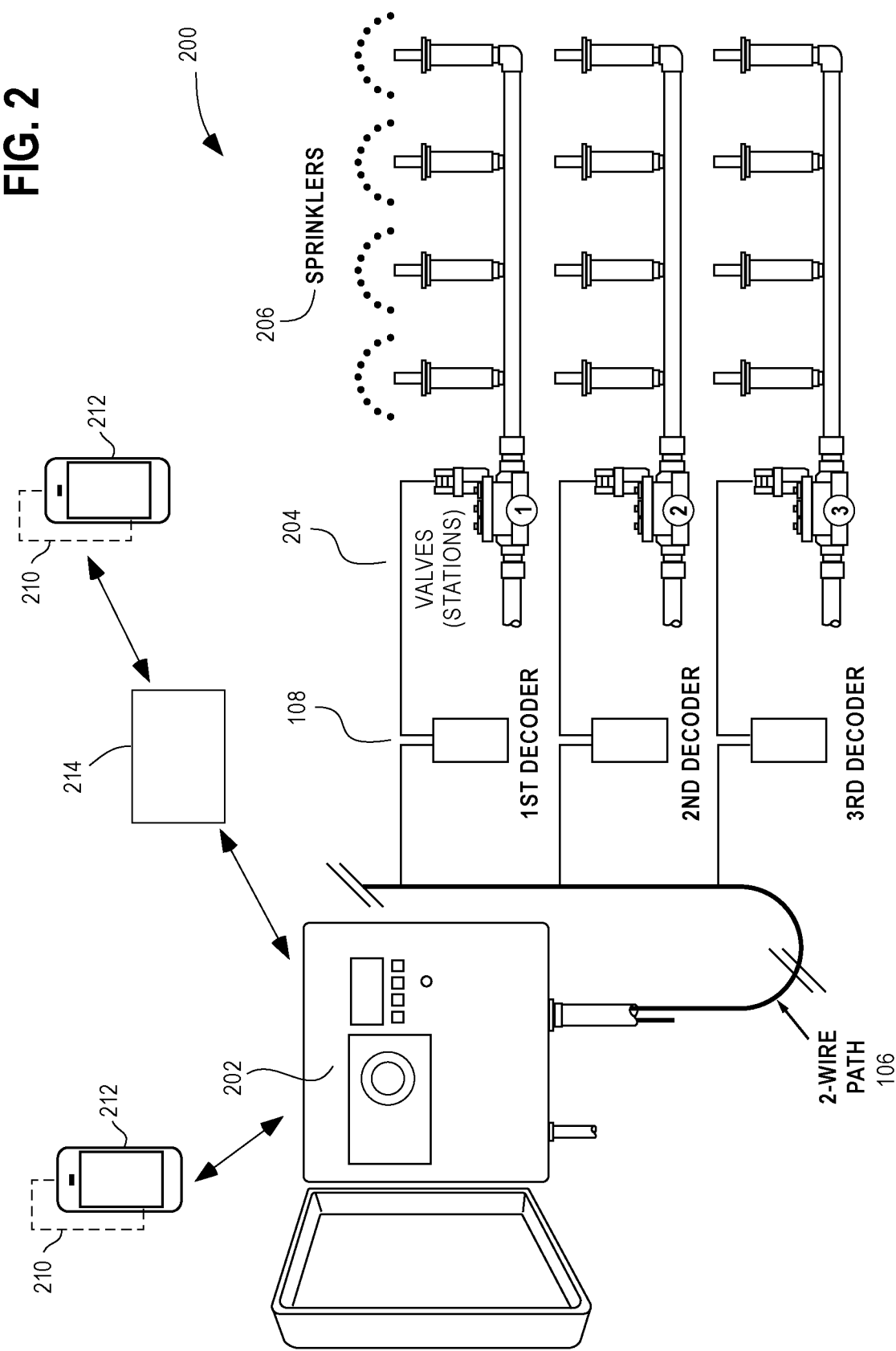

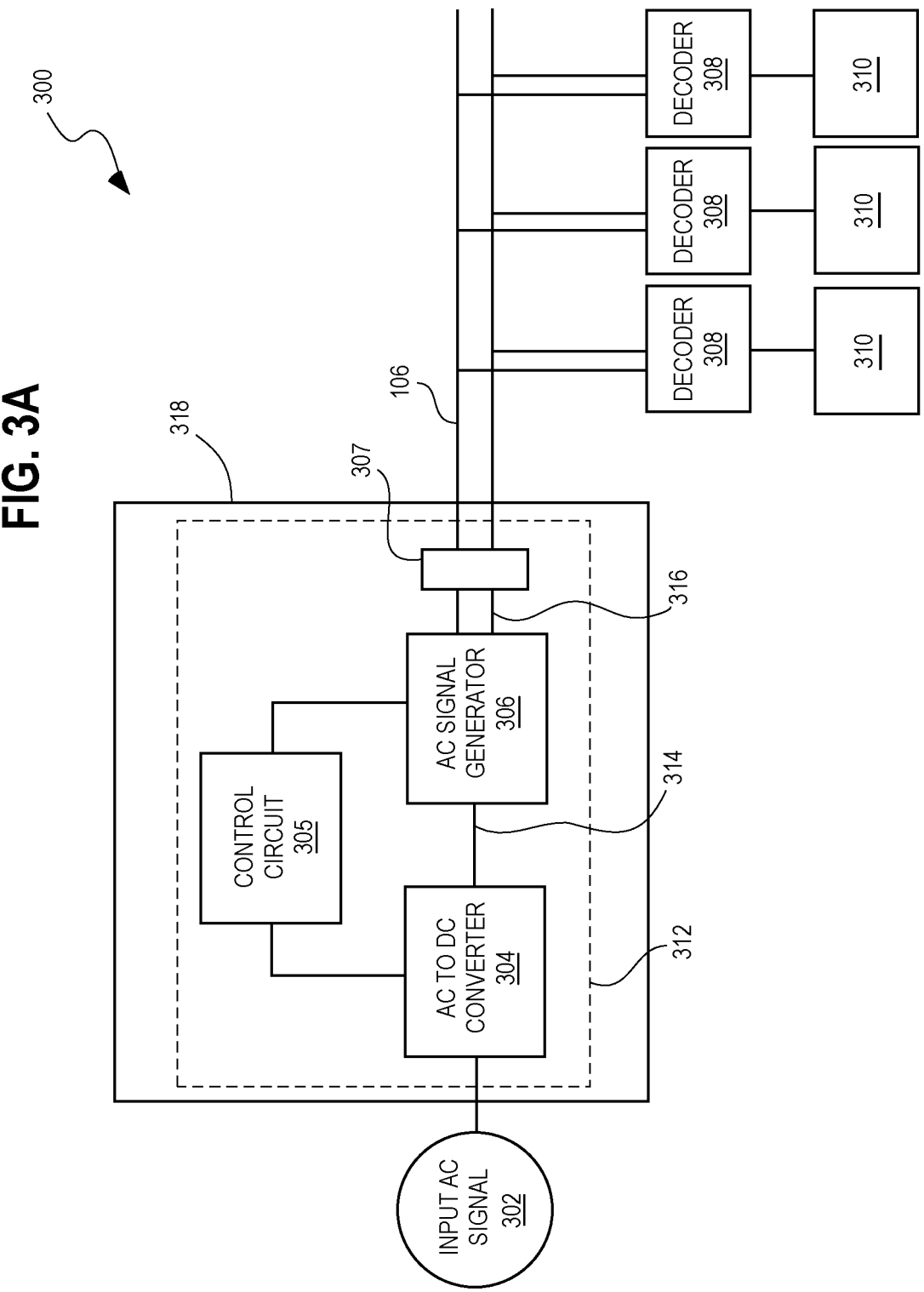

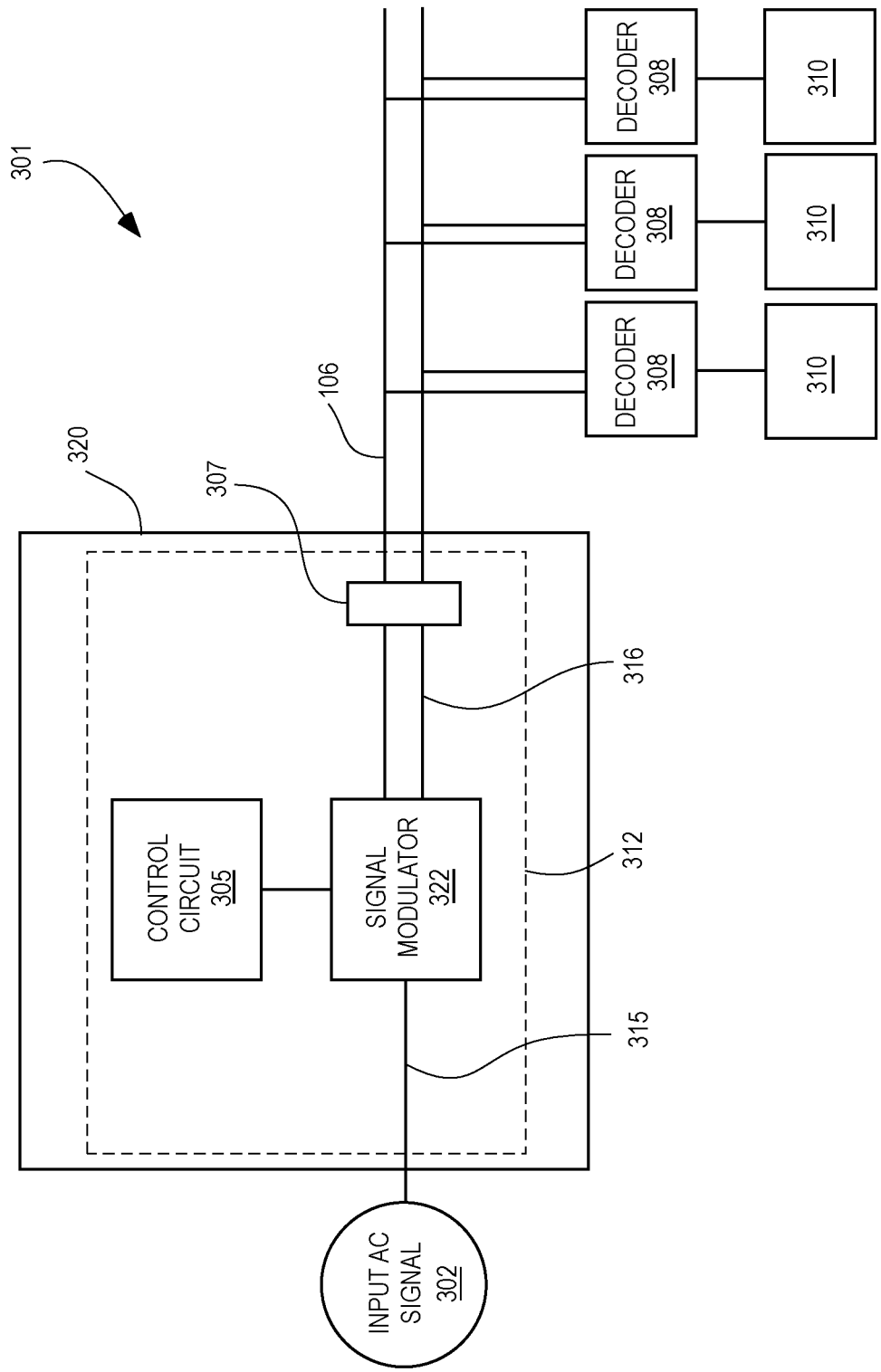

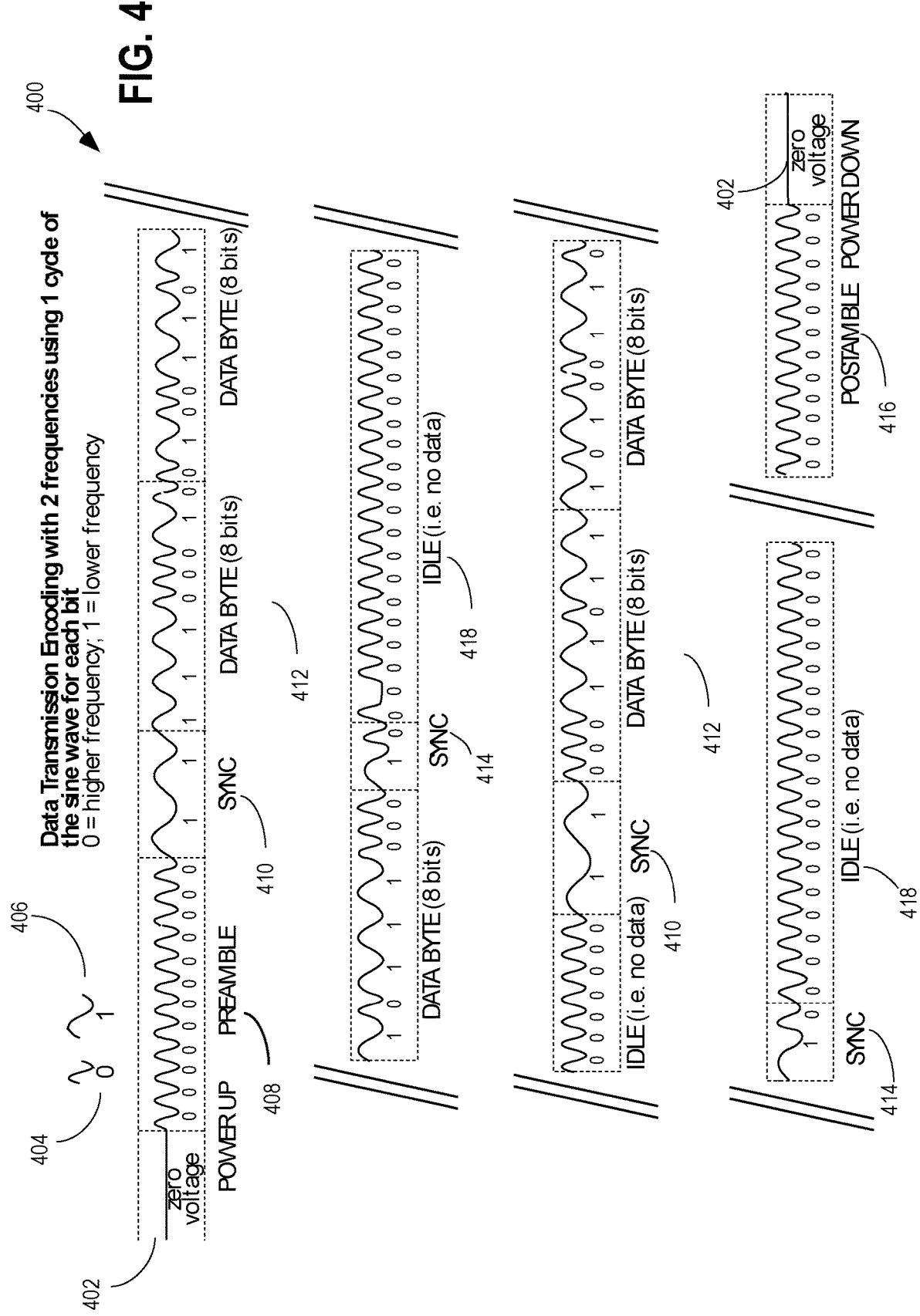

FIG. 6

CODEWORD FIELDS

| S1 | S2 | Ap1 | Bp1 | Ap2 | Bp2 | Ad1 | Bd1 | Ap3 | Bp3 | Ad2 | Bd2 | Ap3 | Bd3 | Ad4 | Bd4 |
|----|----|-----|-----|-----|-----|-----|-----|-----|-----|-----|-----|-----|-----|-----|-----|

— 602

| BIT | DESCRIPTION |
|---|---|
| S1, S2 | PREAMBLE<br>11 = DATA CODEWORD (DATA AND PARITY ARE VALID)<br>10 = IDLE (ALL PARITY AND DATA BITS SET TO ZERO FOR IDLE CODEWORDS) |
| Ap1, Ap2, Ap3 | HAMMING PARITY BITS FOR NIBBLE A (MOST SIGNIFICANT NIBBLE) |
| Ad1, Ad2, Ad3, Ad4 | DATA BITS FOR NIBBLE A (Ad1 IS MOST SIGNIGANT, Ad4 IS LEAST SIGNIFICANT |
| Bp1, Bp2, Bp3 | HAMMING PARITY BITS FOR NIBBLE B (LEAST SIGNIFICANT NIBBLE) |
| Bd1, Bd2, Bd3, Bd4 | DATA BITS FOR NIBBLE B (Bd1 IS MOST SIGNIFICANT, Bd4 IS LEAST SIGNIFICANT |

| FEEDBACK BIT INDEX | FEEDBACK PARTITION (4 MATCHING ADDRESS BITS, PLUS 4 ADDITIONAL BITS PER THE NUMBER OF FEEDBACK SLOTS) | MATCHING ADDRESS RANGE |
|---|---|---|
| 0 | 1111 0000 ---- ---- | 1111 0000 0000 0000 ... <br> 1111 0000 1111 1111 ... |
| 1 | 1111 0001 ---- ---- | 1111 0001 0000 0000 ... <br> 1111 0001 1111 1111 ... |
| 2 | 1111 0010 ---- ---- | 1111 0010 0000 0000 ... <br> 1111 0010 1111 1111 ... |
| 3 | 1111 0011 ---- ---- | 1111 0011 0000 0000 ... <br> 1111 0011 1111 1111 ... |
| 4 | 1111 0100 ---- ---- | 1111 0100 0000 0000 ... <br> 1111 0100 1111 1111 ... |
| 5 | 1111 0101 ---- ---- | 1111 0101 0000 0000 ... <br> 1111 0101 1111 1111 ... |
| 6 | 1111 0110 ---- ---- | 1111 0110 0000 0000 ... <br> 1111 0110 1111 1111 ... |
| 7 | 1111 0111 ---- ---- | 1111 0111 0000 0000 ... <br> 1111 0111 1111 1111 ... |
| 8 | 1111 1000 ---- ---- | 1111 1000 0000 0000 ... <br> 1111 1000 1111 1111 ... |
| 9 | 1111 1001 ---- ---- | 1111 1001 0000 0000 ... <br> 1111 1001 1111 1111 ... |
| 10 | 1111 1010 ---- ---- | 1111 1010 0000 0000 ... <br> 1111 1010 1111 1111 ... |
| 11 | 1111 1011 ---- ---- | 1111 1011 0000 0000 ... <br> 1111 1011 1111 1111 ... |
| 12 | 1111 1100 ---- ---- | 1111 1100 0000 0000 ... <br> 1111 1100 1111 1111 ... |
| 13 | 1111 1101 ---- ---- | 1111 1101 0000 0000 ... <br> 1111 1101 1111 1111 ... |
| 14 | 1111 1110 ---- ---- | 1111 1110 0000 0000 ... <br> 1111 1110 1111 1111 ... |
| 15 | 1111 1111 ---- ---- | 1111 1111 0000 0000 ... <br> 1111 1111 1111 1111 ... |

FIG. 9

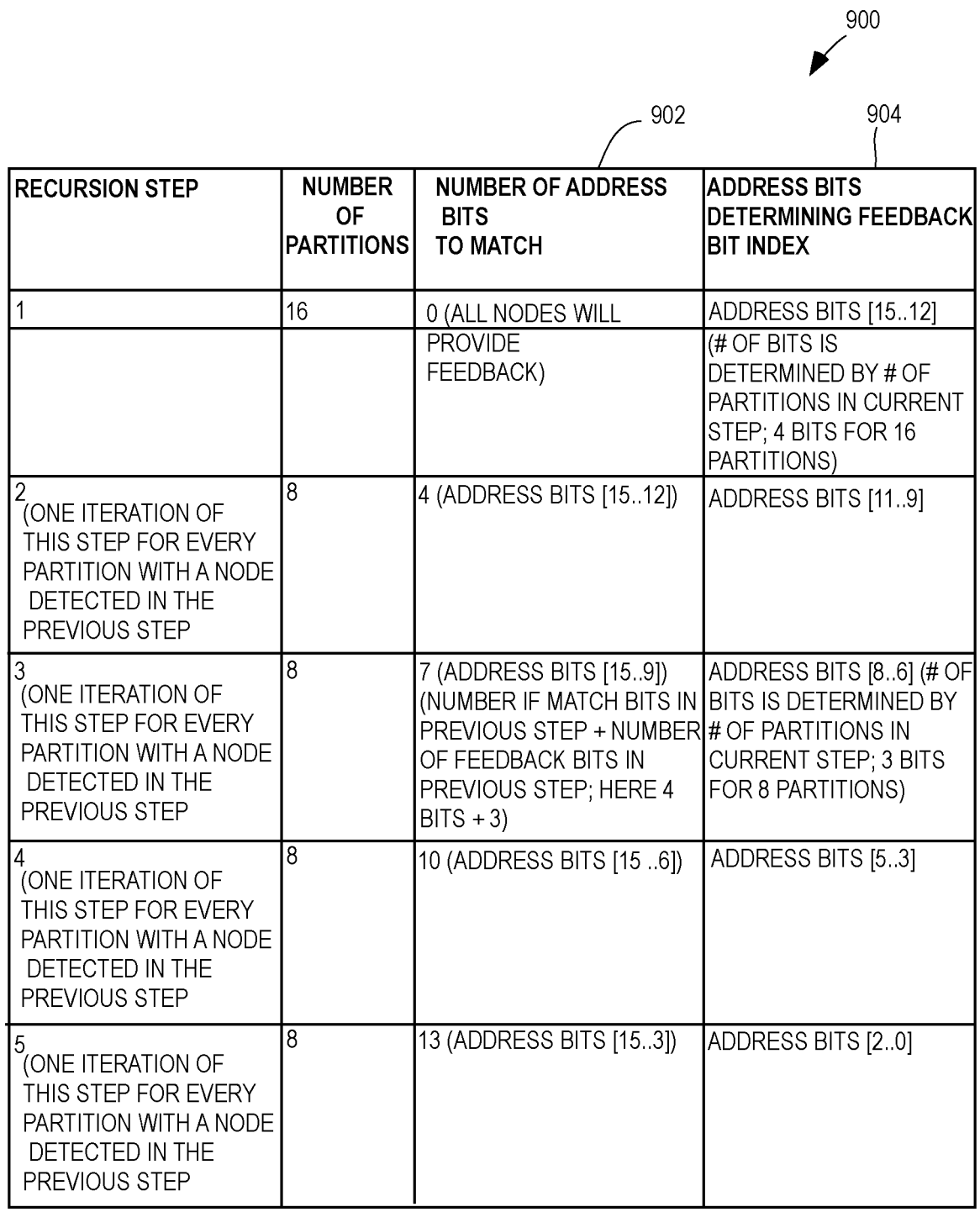

| RECURSION STEP | NUMBER OF PARTITIONS | NUMBER OF ADDRESS BITS TO MATCH | ADDRESS BITS DETERMINING FEEDBACK BIT INDEX |
|---|---|---|---|
| 1 | 16 | 0 (ALL NODES WILL PROVIDE FEEDBACK) | ADDRESS BITS [15..12] (# OF BITS IS DETERMINED BY # OF PARTITIONS IN CURRENT STEP; 4 BITS FOR 16 PARTITIONS) |
| 2 (ONE ITERATION OF THIS STEP FOR EVERY PARTITION WITH A NODE DETECTED IN THE PREVIOUS STEP | 8 | 4 (ADDRESS BITS [15..12]) | ADDRESS BITS [11..9] |
| 3 (ONE ITERATION OF THIS STEP FOR EVERY PARTITION WITH A NODE DETECTED IN THE PREVIOUS STEP | 8 | 7 (ADDRESS BITS [15..9]) (NUMBER IF MATCH BITS IN PREVIOUS STEP + NUMBER OF FEEDBACK BITS IN PREVIOUS STEP; HERE 4 BITS + 3) | ADDRESS BITS [8..6] (# OF BITS IS DETERMINED BY # OF PARTITIONS IN CURRENT STEP; 3 BITS FOR 8 PARTITIONS) |
| 4 (ONE ITERATION OF THIS STEP FOR EVERY PARTITION WITH A NODE DETECTED IN THE PREVIOUS STEP | 8 | 10 (ADDRESS BITS [15..6]) | ADDRESS BITS [5..3] |
| 5 (ONE ITERATION OF THIS STEP FOR EVERY PARTITION WITH A NODE DETECTED IN THE PREVIOUS STEP | 8 | 13 (ADDRESS BITS [15..3]) | ADDRESS BITS [2..0] |

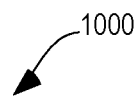

FIG. 10

| RECURSION STEP | NUMBER OF PARTITIONS | NUMBER OF ADDRESS BITS TO MATCH | ADDRESS BITS DETERMINING FEEDBACK BIT INDEX |
|---|---|---|---|
| 1 | 64 | 0 ( ALL NODES WILL PROVIDE FEEDBACK) | ADDRESS BITS [15..10] (6 BITS PROVIDES 64 PARTITIONS) |
| 2 (ONE ITERATION OF THIS STEP FOR EVERY PARTITION WITH A NODE DETECTED IN THE PREVIOUS STEP) | 64 | 6 (ADDRESS BITS [15..10]) (NUMBER IF MATCH BITS IN PERVIOUS STEP + NUMBER OF FEEDBACK BITS IN PREVIOUS STEP; HERE 0 BITS + 6 FB BITS) | ADDRESS BITS [9..4] (6 BITS PROVIDES 64 PARTITIONS) |
| 3 (ONE ITERATION OF THIS STEP FOR EVERY PARTITION WITH A NODE DETECTED IN THE PREVIOUS STEP) | 16 | 12 (ADDRESS BITS [15..4]) (NUMBER IF MATCH BITS IN PREVIOUS STEP + NUMBER OF FEEDBACK BITS IN PREVIOUS STEP; HERE 6 BITS + 6 FB BITS) | ADDRESS BITS [3..0] (4 BITS, NEED 16 PARTITIONS) |

FIG. 12A

| RECURSION DEPTH | ADDRESS | ADDRESS BIT COUNT | FEEDBACK SLOT COUNT | FEEDBACK BITS |
|---|---|---|---|---|
| 0 | ---- ---- ---- ---- | 0 | 8 (64 PARTITIONS) | 0000 0001<br>0000 0000<br>0001 0000<br>0000 0000<br>0000 0000<br>0000 0000<br>0000 0000<br>0000 0000 |
| 1 | 0000 00-- ---- ---- | 6 | 8 (64 PARTITIONS) | 0000 0001<br>0000 0000<br>0000 0000<br>0000 0000<br>0000 0000<br>0000 0000<br>0000 0000<br>0000 0000 |
| 2 | 0000 0000 0000 ---- | 12 | 2 (16 PARTITIONS) | 0000 0010<br>0000 0001 |
| 1 | 0101 00-- ---- ---- | 6 | 8 (64 PARTITIONS) | 0000 0001<br>0000 0000<br>0000 0000<br>0000 0000<br>0000 0000<br>0000 0000<br>0000 0000<br>0000 0000 |
| 2 | 0101 0000 0000 ---- | 12 | 2 (16 PARTITIONS) | 0000 0001<br>0000 0000 |

FIG. 12B

| IRRIGATON DEVICE ADDRESS (HEX) | IRRIGATION DEVICE ADDRESS (BINARY) | ADDRESS BITS DETERMINING FEEDBACK BIT INDEX/LOCATION | | |
|---|---|---|---|---|
| | | RECURSION STEP 1 (RECURSION DEPTH 0) | RECURSION STEP 2 (RECURSION DEPTH 1) | RECURSION STEP 3 (RECURSION DEPTH 2) |
| 0x0001 | 0000 0000 0000 0001 | 0000 0000 0000 0001 | 0000 0000 0000 0001 | 0000 0000 0000 0001 |
| 0x0008 | 0000 0000 0000 1000 | 0000 0000 0000 1000 | 0000 0000 0000 1000 | 0000 0000 0000 1000 |
| 0x5000 | 0101 0000 0000 0000 | 0101 0000 0000 0000 | 0101 0000 0000 0000 | 0101 0000 0000 0000 |

FIG. 14

```
VOID SEARCH (INT ADDRESS, INT NUM_ADDRESS_BITS, INT RECURSION_DEPTH)
{
    INT[ ] BITS_PER_LEVEL = { 6, 6, 4 };
    INT FEEDBACK_BITS = 1 << BITS_PER_LEVEL[ RECURSION_DEPTH];
    INT[ ] FEEDBACK = DISCOVER(ADDRESS,NUM_ADDRESS_BITS, FEEDBACK_BITS);
    FOR (INT I = 0; I < FEEDBACK_BITS; ++I)
    {
        IF (FEEDBACK [I] != 0)
        {
            IF (RECURSION_DEPTH == BITS_PER_LEVEL.LENGTH - 1)   // FINAL STEP?
                CONSOLE. WRITELINE("FOUND NODE AT 0x{X04};" ADDRESS + I);
            ELSE
            {
                // WE HAVE AT LEAST ONE NODE ON THIS PARTITION, SEARCH RECURSIVELY
                INT NEW_ADDRESS_BITS = NUM_ADDRESS_BITS + BITS_PER_LEVEL[RECURSION_DEPTH];
                INT NEW_ADDRESS = ADDRESS + (I << (16 - NEW_ADDRESS_BITS));
                SEARCH(NEW_ADDRESS, NEW_ADDRESS_BITS, RECURSION_DEPTH + 1) ;
            }
        }
    }
}
```

FIG. 15A

EXAMPLE DISCOVERY MESSAGE (WITH FEEDBACK AND IDLE SLOTS) — 1502

| BYTE/BIT | 7 | 6 | 5 | 4 | 3 | 2 | 1 | 0 |
|---|---|---|---|---|---|---|---|---|
| 0 (HEADER) — 704 | 2 (10 IN BINARY) (DISCOVERY PROTOCOL) | | | 3 (00 0011 IN BINARY) (PAYLOAD LENGTH MINUS 1, DOES NOT INCLUDE FEEDBACK SLOTS) | | | | |
| 1 — 706 | 4 (0010 0 IN BINARY) (NUMBER OF ADDRESS BITS TO MATCH) | | | | | 1 (001 IN BINARY) (2^1 = 2 FEEDBACK SLOTS, FOR A TOTAL OF 16 FEEDBACK BITS) | | |
| 2 — 708 | 0xF0 (1111 0000 IN BINARY) (ADDRESS BITS TO MATCH, MOST SIGNIFICANT BYTE) | | | | | | | |
| 3 — 710 | 0x00 (0000 0000 IN BINARY) (ADDRESS BITS TO MATCH, LEAST SIGNIFICANT BYTE) | | | | | | | |
| IDLE — 712 | 0 (0000 0000 IN BINARY) (FEEDBACK SLOT 0, USED FOR FEEDBACK BITS 7..0) | | | | | | | |
| IDLE — 712 | 0 (0000 0000 IN BINARY) (FEEDBACK SLOT 1, USED FOR FEEDBACK BITS 15..8) | | | | | | | |
| IDLE — 714 | 0 (0000 0000 IN BINARY) (REQUIRED IDLE CODEWORD ALLOWING RECEIVERS TO RE-SYNCHRONIZE WITH THE AC WAVEFORM) | | | | | | | |

702 brackets bits 2, 1, 0 of byte 1.

FIG. 15B

| S1 | S2 | Ap1 | Bp1 | Ap2 | Bp2 | Ad1 | Bd1 | Ap3 | Bp3 | Ad2 | Bd2 | Ad3 | Bd3 | Ad4 | Bd4 |
|---|---|---|---|---|---|---|---|---|---|---|---|---|---|---|---|
| 1 | 1 | H | H | H | H | 1 | 0 | H | H | 0 | 0 | 0 | 1 | 0 | 1 |
| 1 | 1 | H | H | H | H | 0 | 0 | H | H | 0 | 0 | 1 | 0 | 0 | 1 |
| 1 | 1 | H | H | H | H | 1 | 0 | H | H | 1 | 0 | 1 | 0 | 1 | 0 |
| 1 | 1 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 |

MODULATED CODEWORD

AUTO-DETECTION OF DEVICES ON A MULTI-WIRE IRRIGATION CONTROL SYSTEM AND AUTO-ASSIGNMENT OF RECEIVERS TO IRRIGATION ZONES

CROSS-REFERENCE TO RELATED APPLICATION

This application claims the benefit of U.S. Provisional Application No. 63/188,997 filed May 14, 2021, entitled AUTO-DETECTION OF DEVICES ON A MULTI-WIRE IRRIGATION CONTROL SYSTEM AND AUTO-ASSIGNMENT OF RECEIVERS TO IRRIGATION ZONES, which is incorporated herein by reference in its entirety.

TECHNICAL FIELD

This invention relates generally to irrigation control systems using multi-wire control paths, and more specifically, to irrigation devices connected to the multi-wire control paths.

BACKGROUND

Generally, decoder-based irrigation systems use a two-wire path (a single pair of wires) extending into a landscape to interface a large number of solenoids to a controller using less wiring relative to a discrete wire path to each solenoid. A controller or interface unit outputs a modulated power signal on the two-wire path to power and control the devices connected to the two-wire path. Decoders connect to the two-wire path at various locations in parallel to each other. Decoders derive their operational power from the modulated power signal and decode to data modulated on the power signal to receive commands and messages. Each decoder has a unique device address that can be addressed so that multiple decoders can be controlled on the "party-line" two-wire path. These unique addresses are often printed on labels of the decoders as a series of numbers and/or represented as printed bar codes. The controller or interface unit addresses individual decoders by their unique address to be able to individually control a given solenoid connected to a decoder. Typical decoder-based systems have tens or hundreds of decoders connected to the two-wire path with digital addresses ranging into the tens of thousands or even higher. In order to address and control these decoders, the unique addresses of the connected decoders need to be programmed or entered into the controller, and stored in a lookup table. Decoder addresses are often written or typed on a listing by an installer and then manually entered in the controller. For example, using the user interface of the controller (buttons, dials, display screen) or using the user interface of a computer (keyboard, mouse, monitor) or other device if the irrigation controller is implemented on a computer. The manual process of address entry is time consuming and error prone. Addresses may also be read from bar codes by an optical reader and then transferred to the controller. Such optical reading is likewise time consuming since a reader must be brought to the decoders or the decoders are brought to the scanner before installation. Additionally, since decoders are frequently buried underground after installation, there are times that a decoder needs to be dug up to verify a digital address if an error occurs.

BRIEF DESCRIPTION OF THE DRAWINGS

Disclosed herein are embodiments of systems, apparatuses and methods pertaining to automatic detection of irrigation devices connected to a multi-wire path irrigation system and/or automatic assignment of irrigation devices to irrigation zones. This description includes drawings, wherein:

FIG. 1 illustrates a simplified block diagram of an exemplary central control-based irrigation system in accordance with some embodiments;

FIG. 2 illustrates a simplified block diagram of an exemplary irrigation controller-based irrigation system in accordance with some embodiments;

FIG. 3A illustrates a simplified block diagram of an exemplary irrigation system including an irrigation control unit with an encoder in accordance with some embodiments;

FIG. 3B illustrates a simplified block diagram of an exemplary irrigation system including an irrigation control unit with an encoder in accordance with some embodiments;

FIG. 4 is a schematic illustration of an exemplary output power signal modulated with data by encoding each cycle of the power signal with one of two frequencies to represent a data bit in accordance with some embodiments;

FIG. 6 shows exemplary codeword fields of an encoded output power signal in accordance with some embodiments;

FIG. 8 shows an exemplary explanatory table of feedback slot assignment in accordance with some embodiments;

FIG. 9 illustrates an exemplary process for automatic discovery of addresses of irrigation devices in accordance with some embodiments;

FIG. 10 illustrates an exemplary process for automatic discovery of addresses of irrigation devices in accordance with some embodiments;

FIG. 12A-12B illustrate an exemplary automatic discovery of addresses of irrigation devices in accordance with some embodiments;

FIG. 14 shows an exemplary pseudo code search algorithm for searching and detecting irrigation devices in accordance with some embodiments;

FIGS. 15A-15B show an illustrative non-limiting example of the message format of FIG. 7 and exemplary process for automatic discovery of addresses of irrigation devices of FIG. 8, respectively, in accordance with some embodiments;

Figure 5:
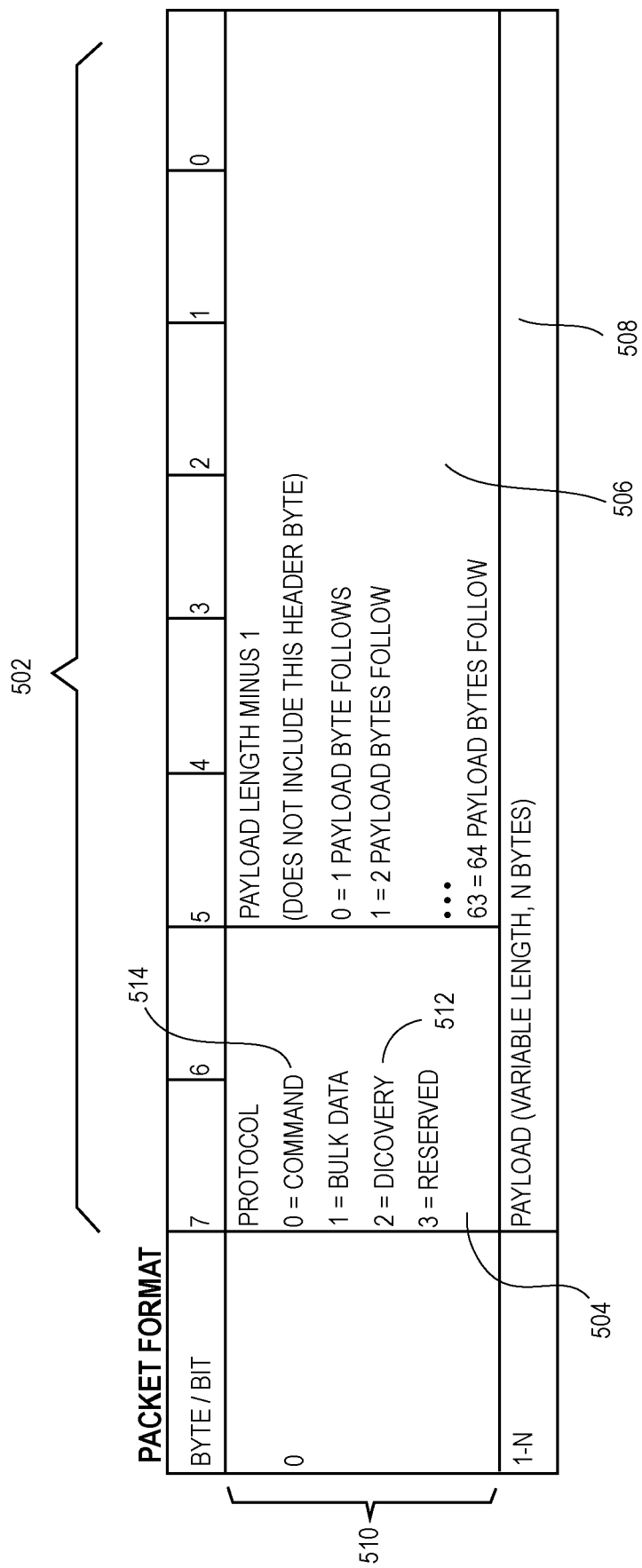
FIG. 5 shows an exemplary data packet format of a message encoded in an output power signal of an exemplary irrigation control unit in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful for automatic detection of irrigation devices connected to a multi-wire path irrigation system and/or for automatic assignment of irrigation devices to irrigation zones. In some embodiments, an irrigation control unit for use with irrigation devices connected to a multi-wire path in an irrigation system includes a modulator that provides an output power signal modulated with data. The irrigation control unit includes a multi-wire interface coupled to the modulator and configured to electrically couple to the multi-wire path extending into a landscape and to which the irrigation devices are connected. Each irrigation device has a unique address. Moreover, each irrigation device may derive operational power from an output power signal and demodulate the modulated data in the output power signal. The irrigation control unit further includes a control circuit coupled to the modulator. The control circuit may execute an automated device discovery process that causes a modulator to modulate data including a discovery message on the output power signal. The discovery message indicates a portion of an address to match and prompts a response from one or more of irrigation devices in which a corresponding portion of the unique address matches the portion of the address to match.

In some embodiments, an irrigation control unit for use with irrigation devices connected to a multi-wire path in an irrigation system including a modulator that provides an output power signal modulated with data. The irrigation control unit includes a multi-wire interface coupled to the modulator and is configured to electrically couple to the multi-wire path extending into a landscape and to which the irrigation devices are connected. The irrigation devices each having a unique address and derives operational power from the output power signal and demodulates the data. The irrigation control unit includes a control circuit coupled to the modulator and executes an automated device discovery process. The automated device discovery process may cause the modulator to modulate data including iterations of discovery messages on the output power signal. In some embodiments, each discovery message indicates a respective portion of an address to match and prompts a response from one or more of the irrigation devices in which a corresponding portion of the unique address matches the respective portion of the address to match. In some embodiments, the responses to each iteration of the discovery message result in a modification of the respective portion of the address to match for subsequent discovery messages.

In some embodiments, a method for use with irrigation devices connected to a multi-wire path in an irrigation system includes providing, by a modulator of an irrigation control unit of the irrigation system, an output power signal modulated with data. The method may include executing, by a control circuit of the irrigation control unit, an automated device discovery process to cause the modulator to modulate data including a discovery message on the output power signal. The discovery message may indicate a portion of an address to match and prompt a response from one or more of the irrigation devices in which a corresponding portion of the unique address matches the portion of the address to match. The method may include providing, by the control circuit via a multi-wire interface, the modulated data over the multi-wire path that extends into a landscape and to which the irrigation devices are connected. Each irrigation device has a unique address and derives operational power from the output power signal and demodulates the data.

In some embodiments, an irrigation control unit for use with irrigation devices connected to a multi-wire path in an irrigation system includes a control circuit and an application including computer program code configured to be executed by the control circuit to perform steps. The steps include obtaining a listing of unique addresses not already assigned to irrigation zones. Each unique address may correspond to a respective one of the irrigation devices. The irrigation devices may be connected to a multi-wire path of an irrigation system. The steps may include assigning each unique address of the listing of unique addresses sequentially to available irrigation zones.

In some embodiments, a method for use with irrigation devices connected to a multi-wire path in an irrigation system includes executing, by a control circuit of an irrigation control unit of the irrigation system, a computer program code of an application to perform steps including obtaining a listing of unique addresses not already assigned to irrigation zones. Each unique address can correspond to a respective one of the irrigation devices The irrigation devices can be connected to a multi-wire path of an irrigation system. The method includes assigning each unique address of the listing of unique addresses sequentially to available irrigation zones.

The description provides various descriptions and examples for automatic detection of irrigation devices connected to a multi-wire path irrigation system and/or for automatic assignment of irrigation devices to irrigation zones. Initially, supporting details and descriptions of various decoder-based irrigation systems are described with reference to FIGS. 1-6. Various embodiments of automatic detection of irrigation devices connected to a multi-wire path irrigation system are described with reference to FIGS. 7-17. And various embodiments of automatic assignment of irrigation devices to irrigation zones are described with reference to FIGS. 18A-21.

In FIG. 1, a simplified block diagram of an exemplary central control-based irrigation system 100 is shown. By one approach, a central control-based irrigation system 100 includes a computer 102, although in a central control system, it is understood that the computer 102 can be a computer, a computer system, a mobile computer device, a smart phone, a tablet computer, a server or a server system, for example. The computer 102 may be at the irrigation site (landscape) or may be remote from the irrigation site. The computer 102 has central control irrigation control software installed thereon that can create and/or execute all irrigation schedules and programming. Often, the computer 102 generates schedules for hundreds of irrigation stations or zones in the field. In some configurations, the computer 102 is coupled to one or more field interface devices or irrigation control units 104. FIG. 1 illustrates an irrigation control unit 104. The computer 102 may be coupled to the irrigation control unit 104 through various types of wired and/or wireless local area networks and/or wide area networks. The irrigation control unit 104 is the interface to the local irrigation devices 108 in the field, such as decoders, receivers, sprinklers, sensors and so on. In a decoder-based system, the irrigation control unit 104 includes an encoder or a modulator and a multi-wire output interface that electrically couple to a multi-wire path 106 (e.g., a two-wire path) that extends from the irrigation control unit 104 into the field. The multi-wire path 106 can extend tens or hundreds of meters in the landscape. The multi-wire path 106 is typically a two-wire path; however, it is understood that this path may be a three or more wire path. The irrigation control unit 104 receives irrigation commands and/or irrigation schedules from the computer 102, and uses the encoder/modulator to encode or modulate data from these commands and/or schedules onto an output power signal that is applied to the multi-wire path 106. The output power signal provides power and control signaling over the multi-wire path 106 to irrigation devices 108 connected to the multi-wire path 106. As is common, various irrigation devices 108 (e.g., decoders, receivers, and so on) connected to the multi-wire path 106 at different locations in the field. These irrigation devices 108 receive the output power signal and derive their operational power and decode or demodulate the data on the signal to determine if the data from the signal is intended for the particular device or not, and if it is, the device takes any action indicated by the data. For example, if the computer 102 intends that a given irrigation device 108 is to cause irrigation, the output power signal is modulated with data to address the given irrigation device 108 and provide a turn on command. The given irrigation device 108 decodes or demodulates data on the multi-wire path 106 and decodes or demodulates the turn on command. The irrigation device 108 then causes an electrically actuated solenoid valve connected to (or integrated with) the irrigation device to open allowing water to flow through the valve to the sprinkler device/s in the flow path of the valve. In a typical decoder-based control system, there may be tens or hundreds of irrigation devices 108. Although only one multi-wire path 106 is shown in FIG. 1, it is understood that there may be more than one multi-wire path extending from the irrigation control unit 104.

In FIG. 2, a simplified block diagram of an exemplary irrigation controller-based decoder irrigation system 200 is shown. In this embodiment, a dedicated irrigation controller, referred to as irrigation control unit 202, includes all functionality to generate and execute irrigation schedules with user input. That is, the irrigation control unit 202 includes a user interface (e.g., rotary dial, buttons, switches, display screen, and so on) and includes programming (e.g., firmware stored in memory of the controller). Thus, in some embodiments, the functionality of the computer 102 and irrigation control unit 104 of FIG. 1 may be implemented in the irrigation control unit 202. For example, the irrigation control unit 202 includes an encoder or modulator that is configured to encode or modulate data based on the stored irrigation schedules and/or manual user commands onto an output power signal that is applied to the multi-wire path 106 (e.g., a two-wire path as shown in FIG. 2). For example, the output power signal output over the multi-wire path 106 provides operational power to the irrigation devices 108 (illustrated as decoders) and/or is modulated with data in order to address and instruct the devices 108 according to the irrigation programming in the irrigation control unit 202. Relative to the system of FIG. 1, FIG. 2 illustrates valves 204 (e.g., latching or non-latching solenoid activated valves) coupled to the devices 108. The valves 204 control water flow through a pressurized water pipe to sprinkler devices 206. In some embodiments, the valves 204 are referred to as zones or stations, each having an assigned number. It is understood that there may be one or more valves 204 coupled to a given device 108. In some embodiments, the functionality of the irrigation control unit is implemented in a front panel or control module having the main control circuit board and microcontroller, and the functionality to interface with and encode signals for the multi-wire path 106 is provided in an encoder/modulator module that is electrically coupled to the front panel, the encoder/modulator module including the multi-wire interface connectors. A commercial example of a decoder-based irrigation controller is the Rain Bird ESP-LXD Series Two-Wire Decoder Controller, commercially available from Rain Bird Corporation of Azusa, California, United States. See also, U.S. Publication No. US2020/0100440, published Apr. 2, 2020, entitled IRRIGATION CONTROLLER WITH RELAYS, which describes various decoder-based irrigation controllers and is incorporated herein by reference. And see also, U.S. application Ser. No. 17/175,372, filed Feb. 12, 2021, entitled DATA MODULATED SIGNAL GENERATION IN A MULTI-WIRE IRRIGATION CONTROL SYSTEM, which describes various decoder-based irrigation controllers and data modulation approaches and is incorporated herein by reference.

In some embodiments, a user interface of the exemplary irrigation controller-based decoder irrigation system 200 is implemented at least in part at a device remote from the irrigation control unit 202 and in communication with the control unit 202. For example, at least portions of the user interface are implemented by a mobile application 210 installed on and executed by a mobile electronic device 212 such as a mobile phone or tablet. When executed, the mobile application 210 causes the mobile electronic device 212 to wirelessly communicate with the irrigation control unit 202 having a wireless transceiver. This communication may be direct between the mobile electronic device 212 and the irrigation control unit 202 (e.g., using Bluetooth or WiFi), and/or may be via one or more intermediary devices 214 (such as servers, routers, repeaters, network devices, cellular communication systems, local area networks, and so on). The mobile application 210 provides a control interface to the user via the user interface of the mobile electronic device 212 (e.g., using a touch sensitive display screen, buttons, voice input, etc.). In such embodiments, the mobile application 210 and the mobile electronic device 212 provide and include all functionality to receive user input and commands used to generate and execute irrigation schedules. In some embodiments, the user interface may be entirely implemented via the mobile application 210 and mobile electronic device 212 such that a user interface (rotary dial, buttons, switches, display screen, and so on) for user input is not needed at the control unit 202. Further, it is understood that in some embodiments, the irrigation control unit 102 of FIG. 1 may similarly communicate with a mobile application of a mobile electronic device to receive some or all of the input needed to generate and execute irrigation schedules.

In known decoder-based control systems, there are various ways to encode or modulate data onto the signal that is applied to a two-wire path. Many approaches involve modulating one or more of the amplitude, phase, and frequency of an alternating current (AC) power signal. For, example, many known approaches selectively clip an amplitude of the power signal in order to encode data bits on the power signal. For example, see U.S. Pat. No. 8,260,465, issued Sep. 4, 2012, entitled DATA COMMUNICATION IN A MULTI-WIRE IRRIGATION CONTROL SYSTEM, and U.S. application Ser. No. 17/175,372 referred to above, both of which describe various data modulation techniques and are incorporated herein by reference.

In accordance with several embodiments, circuits, systems and methods are provided to produce an output power signal for the multi-wire path. FIGS. 3A and 3B provide different examples of devices that use a modulator to provide an output power signal that is modulated with data. In some embodiments, an input power signal is converted into a DC voltage, which is used to generate an AC signal modulated with data. For example, referring next to FIG. 3A, a simplified block diagram is shown of an exemplary irrigation system 300 that includes an irrigation control unit 318 including an encoder (encoder circuit) that generates an output power signal that is applied to the multi-wire path 106. In some embodiments, the irrigation control unit 318 may correspond to the irrigation control unit 104 and/or the dedicated irrigation control unit 202. By one approach, the irrigation control unit 318 includes an encoder 312 having an AC to DC converter 304, a control circuit 305 and a signal generator 306 (which can be more generically referred to as a modulator). In some embodiments, an input AC power signal source 302 is coupled to the AC to DC converter 304 which outputs a DC voltage 314. In one configuration, the input AC signal source 302 may provide a 120 VAC signal and/or 240 VAC signal at 50 Hz and/or 60 Hz. It is understood that the characteristics of the signal from the input AC signal source 302 will depend on the power source and can have any suitable voltage level and frequency. It is further understood that the signal from the input AC signal source 302 may be a power signal input into the irrigation control unit 318 (e.g., from the wall) or may be a stepped down or transformed power signal. The DC voltage 314 output by the AC to DC converter 304 is input to the signal generator 306. For example, the DC voltage may be at any suitable level, such as at 24, 40, 48 volts DC. The value of the DC voltage will vary depending on the requirements of the system.

The AC to DC converter 304 is coupled to a control circuit 305 which is also coupled to the signal generator 306. The control circuit 305 is a processor-based device including one or more processors, and operates with one or more integrated or connected memories. The control circuit 305 and the memory may be integrated together, such as in a microcontroller, application specification integrated circuit, field programmable gate array or other such device, or may be separate devices coupled together. Generally, the control circuit 305 can comprise a fixed-purpose hard-wired platform or can comprise a partially or wholly programmable platform. These architectural options are well known and understood in the art and require no further description here. And generally, the control circuit 305 is configured (for example, by using corresponding software and/or firmware programming as will be well understood by those skilled in the art) to carry out one or more of the steps, actions, and/or functions described herein. For example, in some embodiments, the control circuit 305 controls operation of the encoder 312 and/or the irrigation control unit 318, and outputs signaling to the signal generator 306 to control the waveform of the output power signal 316 provided to the multi-wire path 106.

In some embodiments, under control by the control circuit, the signal generator 306 creates a modulated output signal having any desired signal characteristics or modulation technique. The output power signal 316 is coupled to the multi-wire path 106 at a multi-wire path connector or multi-wire interface 307. In some embodiments, the output power signal 316 provides operational power to the irrigation devices (e.g., decoders 308) coupled to the multi-wire path 106, in such case, the output power signal may also be referred to as an AC power signal. In some embodiments, the output power signal 316 is modulated with data but does not provide operational power, i.e., the devices connected to the multi-wire path receive their operational power in other ways, such as through battery power or connection to a different power supply.

One or more irrigation control devices are connected to the multi-wire path 106 at variously locations about the length of the path 106. As illustrated in FIG. 3A, these irrigation control devices are shown as decoders 308 (which may also be referred to as demodulators or receivers). The decoders 308 derive operational power from the received signal and decode the data from the signal to determine if they are addressed and receive and execute any received commands. In some embodiments, the decoders 308 corresponds to irrigation devices 108 of FIG. 1 and/or FIG. 2.

Depending on the signaling output from the control circuit 305, the output power signal 316 provided by the signal generator 306 may be modulated in any number of ways. In some embodiments, the output power signal is one or more of amplitude, frequency, and phase modulated with data.

In some embodiments, the output power signal is frequency modulated. For example, in some embodiments, the signal generator 306 creates a signal in which the frequency of one or more cycles of the signal is selectively changed to modulate data bits on the signal, e.g., using a frequency shift keying modulation. For example, as controlled by the control circuit 305, the signal generator 306 selectively changes the frequency of each cycle of the AC signal (at the start of each cycle) to one of two or more values, e.g., 55 and 65 Hz, thereby outputting a modulated output power signal 316 over the multi-wire path 106. In some embodiments, the decoders 308 determine whether each cycle is at 55 Hz and/or 65 Hz to extract the corresponding 1 or 0 data bit. In an illustrative non-limiting example, by using frequencies close to 60 Hz, the modulated signal may power the decoders 308 and any connected irrigation components 310, such as latching or non-latching solenoids, sensors, and so on.

In some embodiments, the output power signal is phase modulated. For example, in some embodiments, the signal generator 306 may create a signal in which the phase of one or more cycles of the signal is selectively changed to modulate data bits on the signal. For example, as controlled by the control circuit 305, the signal generator 306 selectively changes the phase of each cycle of the output power signal (at the start of each cycle) to be in phase or out of phase thereby outputting a modulated output power signal 316 over the multi-wire path 106.

Referring next to FIG. 3B, a simplified block diagram is shown of an exemplary irrigation system 301 that includes an irrigation control unit 320 including an encoder 312 (encoder circuit) that modulates and provides an output power signal that is applied to the multi-wire path 106. In some embodiments, the irrigation control unit 320 may correspond to the irrigation control unit 104 and/or the dedicated irrigation control unit 202. By one approach, the irrigation control unit 320 includes an encoder 312 having a control circuit 305 and a signal modulator 322 (which, like the signal generator 306, can be more generically referred to as a modulator). In some embodiments, the input AC power signal source 302 provides the input power signal 315 to the signal modulator. In one configuration, the input AC signal 315 may be a 120 VAC signal and/or 240 VAC signal at 50 Hz and/or 60 Hz. It is understood that the characteristics of the input AC signal 315 will depend on the power source and can have any suitable voltage level and frequency. It is further understood that the input AC signal 315 may be a power signal input into the irrigation control unit 318 (e.g., from the wall) or may be a stepped down or transformed power signal.

The control circuit 305 will be powered by a rectified and stepped down DC signal obtained from the input AC signal 315 and is coupled to and controls the signal modulator 322. The control circuit 305 controls operation of the encoder 312 and/or the irrigation control unit 320, and outputs signaling to the signal modulator 322 causing it to modulate the input AC signal 315 to resulting in the output power signal 316 provided to the multi-wire path 106 via a multi-wire path connector or multi-wire interface 307. Like that described in FIG. 3A, the output power signal 316 provides operational power to the irrigation devices (e.g., decoders 308) coupled to the multi-wire path 106. In some embodiments, the output power signal 316 is modulated with data but does not provide operational power, i.e., the devices connected to the multi-wire path receive their operational power in other ways, such as through battery power or connection to a different power supply. Depending on the signaling output from the control circuit 305, the output power signal 316 provided by the signal modulator 322 may be modulated in any number of ways. In some embodiments, the output power signal is one or more of amplitude, frequency, and phase modulated with data. However, in contrast to the signal generator 306 of FIG. 3A, the signal modulator 322 does not generate the output power signal. It modulates the input power signal to provide the output power signal. Further, while not shown in FIGS. 3A and 3B, the encoders 312 may also include one or more switches or relays (such as solid state relays (SSRs), e.g., reed relay coupled SSR, transformer coupled SSR, photo-coupled SSR, among other type of SSRs that are commercially available) that couple or connect the output power signal to the multi-wire interface. And similarly, while not shown in FIGS. 3A and 3B, there may be more than one multiple-wire interface configured to couple to multiple multi-wire paths, such as described in U.S. Publication No. US2020/0100440, referred to above and is incorporated herein by reference.

In the exemplary embodiment of FIG. 4, output power signal 400 is modulated with data by encoding each cycle of the output power signal with one of two frequencies to represent data bits. Each cycle of the output power signal is modulated to be either at a first frequency (see first cycle 404) or at a second frequency (see second cycle 406). As illustrated, the first cycle 404 is at a higher frequency (the first frequency) than the second cycle 406 (the second frequency). Alternatively, in some embodiments, the second cycle 406 is at a higher frequency than the second cycle 406. As can be seen, in these embodiments, the first cycle 404 represents a logic 0 and the second cycle 406 represents a logic 1. In the illustrated embodiment, the signal protocol includes a preamble 408, a data sync portion 410, a data portion 412, an idle sync portion 414, an idle portion 418, and a postamble 416. In some embodiments, the decoder may not be powered on as shown in 402 where zero voltage is applied to the path. During the start of power/data transmission, the preamble 408 is sent as a number of the first cycles to provide the decoder and/or the irrigation devices time to power up and/or activate before it is time to decode data. Next, a sync portion 410 having a known sequence of modulated cycles is provided to indicate the start of data transmission. For example, in some embodiments, during a first period of time, one or more cycles of the waveform are modulated at one or more first frequencies to synchronize a start of the modulated data portion of the waveform. Next, the data portion 412 is provided that includes a series of cycles modulated as either cycle 404 or 406 to transmit data bits (and data bytes) to the decoder. For example, in some embodiments, during a second period, the output power signal is modulated such that one or more cycles of the output power signal are at one or more second frequencies to create the modulated data portion. In some embodiments, the second frequencies can be the same as the first frequencies, can have one or more frequencies in common or can be different frequencies. In some embodiments, the encoded data in the modulated data portion can represent one or more of a first instruction to activate one or more irrigation devices and a second instruction to deactivate the one or more irrigation devices. There may also be periods of no data transmission shown by the idle portion 418. In some embodiments, the period of time provided by the idle portion 418 is a period of time that the irrigation control unit 104 of FIG. 1 and/or the dedicated irrigation control unit 202 of FIG. 2 have allotted to receive a response from one or more decoders 108 and/or irrigation devices. For example, in some embodiments, there may be one or more periods within the modulated data portion where the output power signal is modulated such that one or more cycles of the output power signal are at one or more first frequencies to separate data content of the modulated data portion. If data transmission is to resume, another data sync portion 410 and data portion 412 are provided.

If no further data transmission is needed, the idle portion 418 is followed by the postamble 416, and then the signal is no longer applied to the multi-wire path. In some embodiments, the postamble 416 resembles the idle portion 418 with the exception of the data sync portion 410 that precedes the idle portion 418. For example, in some embodiments, the output AC signal is modulated such that one or more cycles of the output power signal are at the one or more first frequencies to synchronize an end of the modulated data portion of the output power signal. Given that each cycle of the power signal is modulated to one of two frequencies, the decoding circuitry need only detect the timing of zero crossings to determine the frequency of a given cycle, and thus, the data bit represented by the cycle. In some embodiments, one or more frequencies are used for modulating data in the data portion (e.g., the one or more second frequencies) and at least one different frequency is used in the portions of the waveform that serve to frame (sync and/or end) or separate the data portion. Further variations of frequency modulation of the output power signal are described in U.S. application Ser. No. 17/175,372 referred to above, and which is incorporated herein by reference.

Referring now to FIG. 5, an exemplary data packet format 502 is shown of a message encoded in an output power signal of an exemplary irrigation control unit in accordance with some embodiments. In some embodiments, the irrigation control unit may correspond to the irrigation control unit 104 of FIG. 1, the dedicated irrigation control unit 202 of FIG. 2, and/or the irrigation control unit 318 and 322 of FIGS. 3A and 3B. FIG. 6 shows exemplary codeword fields/format 602 of an encoded output power signal in accordance with some embodiments. In some embodiments, information is sent across a multi-wire path 106 (e.g., a two-wire path) in 16-bit codewords (which may be referred to generically as signals) that correspond to either an idle pattern or an 8-bit data byte. For example, the exemplary output power signal shown in FIG. 4 is sent over the multi-wire path 106 in 16-bit codewords (e.g., in FIG. 4, the data portion 412 is a 16-bit codeword and the idle portion 418 is another 16-bit codeword). As shown in the codeword fields 602 along with the explanation in exemplary table 604 of FIG. 6, the first two bits of each codeword provide a synchronization preamble 606 that allows both codeword alignment and idle detection. The remaining 14 bits include either all zero bits (for an idle codeword) or two Hamming encoded data nibbles (for a data codeword, which is also referred to or described herein as encoded modulated data or message).

The Hamming-encoded nibbles are interleaved within the codeword to provide better error correction in the presence of two consecutive bit errors. For example, bit errors may typically come in pairs given the use of zero-cross timing analysis to demodulate the bit stream on the multi-wire path 106. By one approach, if the timing on one bit is incorrectly determined, this may affect both that bit and the following bit since the start time of the following bit is, by definition, the end time of the preceding bit. As such, this may result in bit error pairs that manifest as either (1,0) or (0,1) pairs. Thus, interleaving spreads the consecutive bit errors over the two separately-encoded nibbles, such that each nibble suffers a single bit error, which can be corrected by the Hamming decoding. It is understood by those skilled in the art that other error detection schemes other than the Hamming codes may be used to detect and/or correct errors in data transmitted over a multi-wire path 106. Moreover, the determination and/or calculation of the Hamming parity bits in the table 604 is known in the art and will not be described herein in details.

In some embodiments, a bit error in the synchronization preamble for codewords within a message may be allowed due to codeword alignment to the idle pattern, which allows the irrigation control unit to carry that alignment forward into following codewords even in the presence of bit errors in the synchronization preamble. In such an embodiment, the receiver (e.g., irrigation device 108) may determine that the codeword is valid if at least one of the preamble bits is a one. Alternatively and/or in addition to, the receiver (e.g., irrigation device) may determine that a loss of synchronization has occurred if both bits of the synchronization preamble are zero. In some embodiments, one or more irrigation devices receiving the codewords transmitted by the irrigation control unit may discard the received idle codewords and decode the data codewords into message bytes.

In FIG. 5, the exemplary data packet format 502 illustrates the format of the data/message sent over the multi-wire path 106. The data packet starts with a one byte header 510 defining the message protocol 504 and the length of the packet payload 506. The protocol field 504 identifies the format of the embedded payload data 508. In some embodiments, the discovery protocol 512 and/or certain command messages 514 support feedback from irrigation devices. This feedback may occur during IDLE codewords (e.g., feedback portions 712 of FIG. 7) sent immediately following the data packet triggering the feedback.

Discovery of Addresses of Devices

In some embodiments, in order to address the irrigation devices connected to a multi-wire path in these decoder-based irrigation systems, the unique addresses of the irrigation devices are to be known at the irrigation control unit 104, 202 or at the computer 102 if it is creating the messages/commands to be modulated on the output power signal. It is time consuming and error prone to manually enter these addresses into the computer 102 or the irrigation control unit 202. Further, an installer may need to gather all devices in one location to record addresses, or may need to walk the landscape while recording addresses, and may even need to unearth installed devices to record addresses. Further, the process of typing or entering addresses at a computer is tedious and error prone. And in controller-based systems, like the irrigation control unit 202, the user interface at the irrigation control unit 202 is often very limited. For example, there may only be a few keys/buttons and a limited display space. Entering more than even a few addresses in such interfaces is challenging. Even if addresses are optically read and transferred to the irrigation control unit 202 or the computer 102, it is still time consuming to scan the addresses, and may involve going to the site of installed devices and unearthing them to read addresses.

Accordingly, in some embodiments, systems, apparatuses and methods are provided for automatic detection of irrigation devices connected to a multi-wire path irrigation system. Such embodiments provide that irrigation devices are installed in the field and connected to the multi-wire path. The irrigation control unit then executes an automated device discovery process that will determine the unique addresses of the irrigation devices connected to the two-wire path. In some embodiments, this avoids the need to record or scan/read any addresses from the irrigations and avoids the need to transfer or enter the addresses into the irrigation control unit and/or computer. And in some embodiments, since there is not manual recording and entry, human error is removed. Further, in some embodiments, the process or discovering addresses is considerably faster than traditional approaches. In some embodiments, the automatic device discovery process can be executed when devices are installed, and can be re-executed as new devices are added and old devices are removed. In some embodiments, an automatic device discovery process is executed by a control circuit of the irrigation control unit. In some embodiments, the automated device discovery process may be initiated and/or controlled by a computer (e.g., computer 102 coupled to the irrigation control unit 104).

In some embodiments, a control circuit performs an automated device discovery process via the discovery protocol 512. By one approach, a reference to a control circuit described herein may correspond to the control circuits 305 of FIGS. 3A and 3B and/or one or more control circuits associated with the irrigation control unit 104 of FIG. 1, the dedicated irrigation control unit 202, and/or irrigation control unit 318. By another approach, a reference to an irrigation control unit described herein may correspond to the irrigation control unit 104 of FIG. 1, the dedicated irrigation control unit 202 of FIG. 2, and/or irrigation control units 318 and 322 of FIGS. 3A and 3B.

Figure 13:
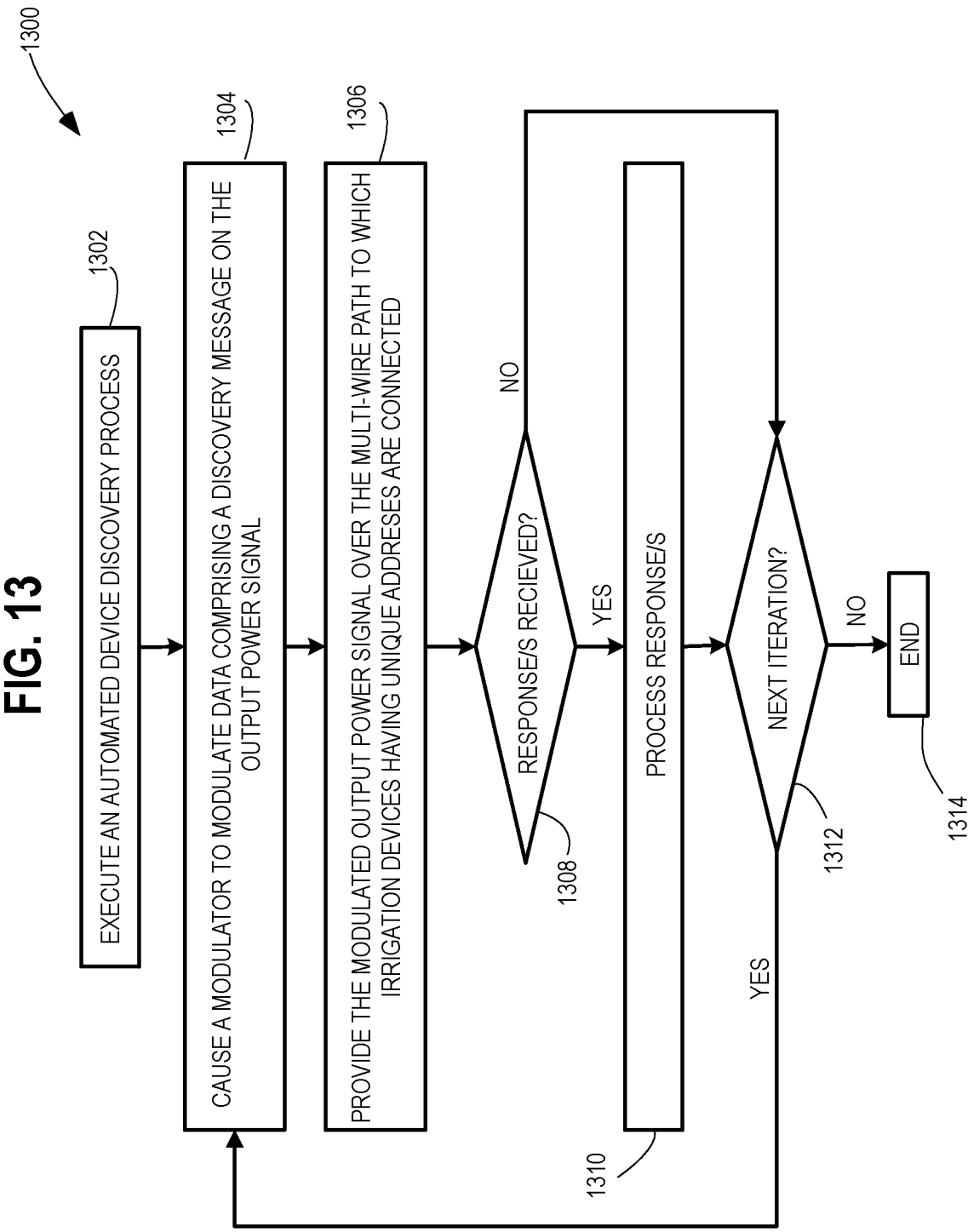
FIG. 13 shows a flow diagram of an exemplary process of automatic discovery of addresses in accordance with some embodiments.

Referring next to FIG. 13, a flow diagram is shown of an exemplary process 1300 of automatic discovery of addresses of irrigation devices in accordance with some embodiments. Initially, an automatic or automated device discovery process is initiated (Step 1302). For example, the process is automatically initiated according to control programming, and/or the process is initiated by a user via user input via a user interface. In some embodiments, the functionality of the process is implemented through the execution of computer program code by a control circuit. For example, a control circuit or microcontroller executes the computer program code (e.g., as firmware) to execute the discovery process. In some embodiments, the code is stored in internal memory of the control circuit, and in other embodiments, the code is stored in a separate memory accessible by the control circuit to retrieve and execute. In some embodiments, the control circuit is part of an irrigation control unit (e.g., irrigation control units 104, 202, 318, 320) and/or part of a computer 102 (e.g., a computer, server, mobile computer device, smart phone, tablet computer, and so on) functioning at least in part as an irrigation control unit. In some embodiments, the control circuit is coupled to and controls a modulator (e.g., the signal generator 306 of FIG. 3A and the signal modulator 322 of FIG. 3B) that provides a modulated output power signal to a multi-wire interface 307. The multi-wire interface 307 is configured to be electrically coupled or connected to the multi-wire path 106 that extends into a landscape and to which irrigation devices are connected. In some embodiments, each irrigation device has a unique address and derives operational power from the output power signal and demodulates the data. And in some embodiments, a purpose of the automatic device discovery process is to discover or find the unique addresses of the irrigation devices connected to the multi-wire path without requiring addresses to be manually recorded and entered in the control unit or optically scanned and transferred to the control unit.

Figure 7:
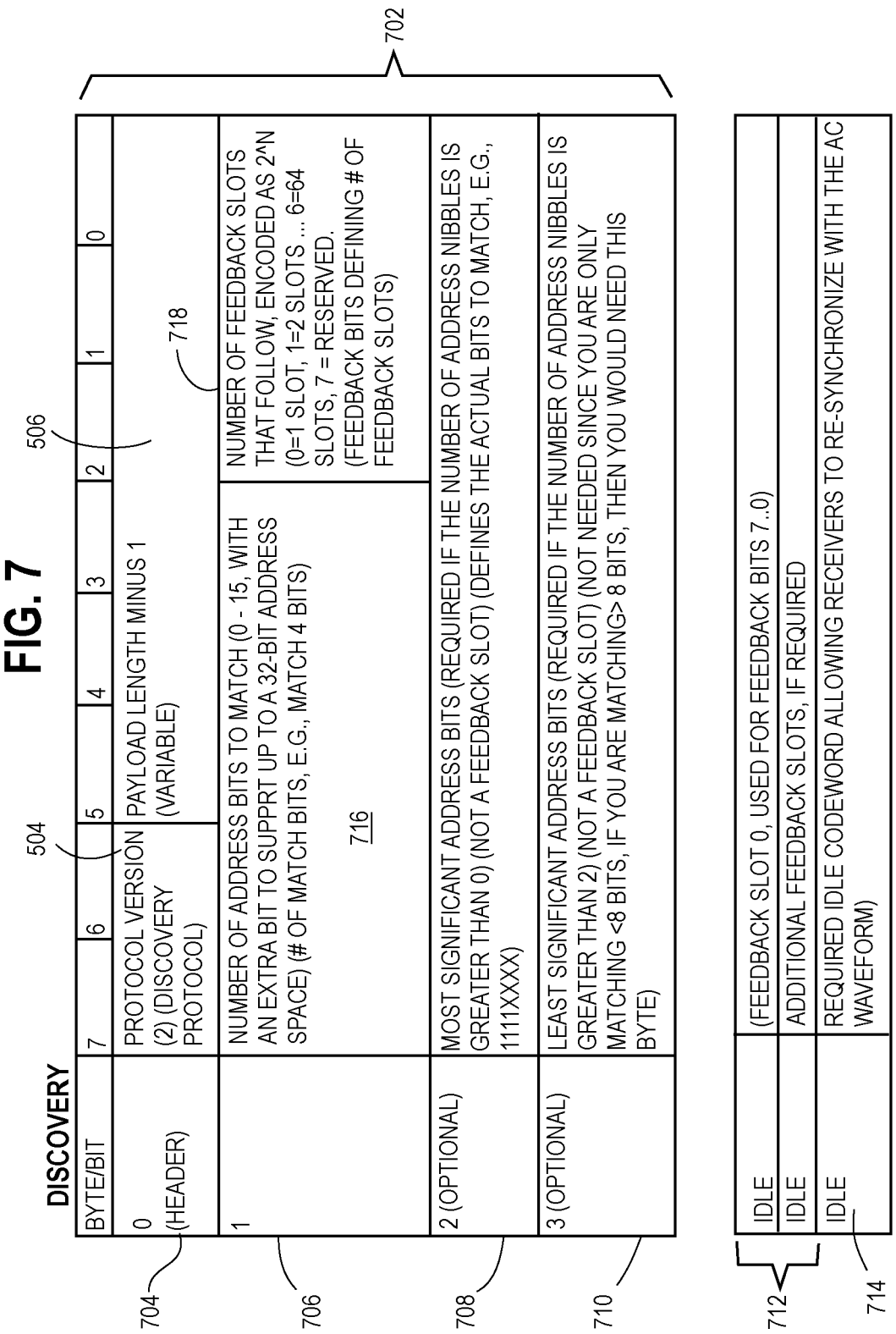
FIG. 7 shows an exemplary discovery message format in accordance with some embodiments.

Once initiated, the modulator is caused (e.g., by the control circuit) to modulate data comprising a discovery message on the output power signal (Step 1304). In some embodiments, the control circuit is coupled to and causes the modulator (e.g., the signal generator 306 or the signal modulator 322) to modulate the output power signal. In some embodiments, the discovery message indicates a portion of an address to match and prompts a response from one or more of the irrigation devices in which a corresponding portion of the unique address matches the portion of the address to match. As described herein, in some embodiments, it is understood that unique addresses need only be unique for a particular installation or multi-wire path, and need not be globally unique across all installations. FIG. 7 illustrates an exemplary format of a discovery message 702 in accordance with some embodiments. For example, the discovery message 702 indicates a portion of an address to match (e.g., from the data in field 716 and indicated by parameter portions 708 and 710) and prompts a response from one or more of the irrigation devices in which a corresponding portion of a unique address matches the portion of the address to match. The discovery message 702 may then be followed by one or more feedback periods of time (also referred to as feedback slots) in feedback portions 712 during which irrigation devices with a matching address portion will provide feedback to indicate their presence on and connection to the multi-wire path 106.

The output power signal is provided or output over the multi-wire path (Step 1306). Next, it is determined if one or more responses to the discovery message are received from one or more irrigation devices connected to the multi-wire path (Step 1308). In some configurations, if a response is not received, the control circuit determines if another iteration of the discovery message is needed (Step 1312). If another iteration is needed (Step 1312), then the control circuit causes the modulator to modulate a next iteration of the discovery message on the output power signal (Step 1304). If another iteration is not needed (Step 1312), this indicates that unique addresses have been found for all devices connected to the multi-wire path and the process ends (Step 1314). Step 1314 will typically occur after multiple iterations depending at least on the number of devices connected and the address space to search. If response/s is/are received in Step 1308, the response/s is/are processed (Step 1310), e.g., to determine additional devices with matching address portions and to assist in determining a next portion of an address to match for the next iteration. Until all addresses are determined, a next iteration is needed (at Step 1312), and the process repeats at Step 1302.

The process of FIG. 13 may be performed by the devices and systems described herein and other devices and systems. For example, control circuits implemented in the irrigation control units (e.g., irrigation control units 104, 202, 318, 320) using modulators (e.g., signal generator 306, signal modulator 322) may execute device discovery processes in some embodiments. Further details are described below and by way of examples.

In some embodiments, the control circuit executes, at step 1304, an automated device discovery process that causes the modulator to modulate data including iterations of discovery messages (e.g., discovery messages 702) on the output power signal. By one approach, the discovery messages each indicate a respective portion of an address to match and prompt a response from one or more of the irrigation devices in which a corresponding portion of the unique address matches the respective portion of the address to match. In some configurations, responses to each iteration of the discovery message result in a modification of the respective portion of the address to match for subsequent discovery messages. In some embodiments, a modification corresponds to an address search covering a narrowing range of addresses to match (another recursion depth). And in some embodiments, the modification corresponds to an address search covering a broadening range of addresses to match (back a recursion depth). In some embodiments, the response from one or more of the irrigation devices indicates that the corresponding portion of the unique address matches the respective portion of the address to match.

In some embodiments, the discovery process response from the one or more of the irrigation devices occurs in a respective feedback period of time (feedback slot) corresponding to an additional portion of the unique address of the one or more of the irrigation devices. In some embodiments, the response from the one or more of the irrigation devices indicates that the corresponding portion of the unique address matches the respective portion of the address to match and indicates the additional portion of the unique address of the one or more of the irrigation devices. For example, if the discover message instructs devices matching the first 4 address bits to respond, and to respond in a feedback period of time indicated by the next 4 address bits, then a response by a device in a given feedback period of time indicates a device exists on the path in which the first 8 address bits are known. And assuming there are more than 8 bits in the address, this information indicates a range of devices that may respond. In some embodiments, this information is used to define the next bits to match in the next discover message. In some embodiments, the automated device discovery process ends when a complete address is matched for each of the one or more of the irrigation devices connected to the multi-wire path. In some embodiments, the automated device discovery process executed by the control circuit causes the modulator to modulate data including an initial discovery message on the output power signal to be transmitted prior to the discovery message. In some configurations, the initial discovery message may prompt a response from each of the irrigation devices connected to the multi-wire path 106 and not specify any address bits to match.

In some embodiments, the discovery message 702 is encoded onto the output power signal in accordance with the codeword field/format 602 and the table 604. In some embodiments, the synchronization preamble 606 and error detection bits (e.g., Hamming parity bits) are encoded with the discovery message 702 onto the output power signal.

In some embodiments, the exemplary discovery message 702 includes a message header portion 704 and/or discovery parameters (a first parameter portion 706, a second parameter portion 708, and a third parameter portion 710). In some configurations, the discovery message 702 may include a data portion defining a number of address bits in the portion of the address to match and defining a value of the address bits of the portion of the address to match. In another configurations, the discovery message 702 may include a feedback portion defining a number of feedback periods of time for irrigation devices matching the portion of the address to respond. In some embodiments, the discovery parameters correspond to the payload data 508 of FIG. 5. By one approach, the message header portion 704 may include a protocol version field 504 and a payload length field 506. Referring back to FIG. 7, the first parameter portion 706 may include a field for number of address bits to match 716 and/or a field for a number of feedback periods of time 718. For example, field 716 may indicate that 4 bits in the address are to be matched, and field 718 may indicate that there are 4 feedback periods of time. In some embodiments, the discovery message 702 includes a first data portion (e.g., the number of address bits to match field 716) and a second data portion (e.g., the number of feedback slots field 718). The first data portion corresponds to and/or defines the portion of the address bits to match and the second data portion corresponds to feedback periods of time for each of the one or more of the irrigation devices to respond. In some embodiments, the first data portion and the second data portion define a range of addresses of irrigation devices to respond to the discovery message. In some embodiments, the first data portion defines a first set of address bits to match and a position of first set of address bits in the address (e.g., a combination of the number of address bits to match field 716 and at least one of the second parameter portion 708 and the third parameter portion 710). For example, the field 716 together with portions 708 and 710 indicate to match the 4 most significant bits, and they should match 1111. The second parameter portion 708 may correspond to most significant address bits to match field 708. The third parameter portion 710 may correspond to least significant address bits to match field 710. In some embodiments, in this example discovery message, if the most significant 8 or less address bits are to be matched, the third parameter portion is not needed. For example, if only matching the most significant 4 bits being 1111, then only the second portion 708 is populated with data. However, if it is intended to match the most significant 9 or more bits, both the second and third parameter portions 708 and 710 are used. In some embodiments, the second data portion may define a set of feedback periods of time in field 718. In some embodiments, each feedback period of time corresponds to a second set of address bits and a position of the second set of address bits in the address. Illustrative non-limiting examples are described below in at least FIGS. 12A, 12B and 15A.

In some embodiments, a feedback period of time for use by each of the one or more of the irrigation devices depends on an additional portion of the unique address of each of the one or more of the irrigation devices, which is illustrated in FIG. 8 and described below. In some embodiments, when a given irrigation device responds to the discovery message 702 during a given feedback period of time (e.g., feedback slot) in feedback portions 712, the response indicates that the given irrigation device matches the first set of address bits and indicates the second set of address bits of the given irrigation device as can be seen in the recursion depths 1 and 2 of FIGS. 12A and 12B. In some configurations, subsequent to the transmission of the modulated data, a control circuit may cause a modulator to transmit over the multi-wire path 106 one or more first idle signals (e.g., idle codewords of the feedback portions 712) corresponding to a feedback period of time the control circuit has allocated to receive the response from the one or more of the irrigation devices.

In yet some embodiments, subsequent to the transmission of the one or more first idle signals, the control circuit may cause the modulator to transmit over the multi-wire path 106 at least one synchronization signal for the irrigation devices. For example, a final idle portion 714 is for synchronization purposes and allows the irrigation devices to re-synchronize (and be ready to receive another discovery message over the multi-wire path 106) after each transmission of discovery message by the control circuit 305. In some embodiments, after the discovery message 702, the feedback portions 712 may be included in the modulated data to provide a period of time for feedback from the irrigation devices. Each feedback portion 712 may include 16 zero bits, and an irrigation device may assert feedback during the bit position corresponding by the next address bits (e.g., the four address bits that follow the match indicated in this command).

As illustrated in FIGS. 12A and 12B, an automated device discovery process executed by a control circuit may detect one or more responses from the one or more of the irrigation devices in which the corresponding portion of the unique address matches the portion of the address to match. The control circuit may determine, based on the detected one or more responses, a next portion of the address to match. Alternatively or in addition to, the control circuit may cause the modulator to modulate data including a next discovery message 702 on the output power signal. In some embodiments, the next discovery message 702 indicates the next portion of the address to match and prompts a next response from at least one of the one or more of the irrigation devices in which a corresponding portion of the unique address matches the next portion of the address to match. In some embodiments, the next portion of the address to match may include the portion of the address to match having already been matched together with another portion of the address to match, such that a narrower range of addresses is targeted by the next discovery message. And in some embodiments, the next portion of the address to match may include another portion of the address to match (e.g., that does not include the prior portion to match), such that a broader range of addresses is targeted by the next discovery message.

In some embodiments, an automated device discovery process executed by the control circuit causes the modulator to modulate data including idle portions on the output power signal subsequent to the discovery message. By one approach, the idle portions may correspond to feedback periods of time for the irrigation devices to respond. The control circuit may detect one or more responses from the one or more of the irrigation devices in one or more of the feedback periods of time. By one approach, the one or more responses may indicate a presence of irrigation devices on the multi-wire path having unique addresses matching the portion of the address to match. In some embodiments, the idle portions includes unmodulated signals.

Figure 16:
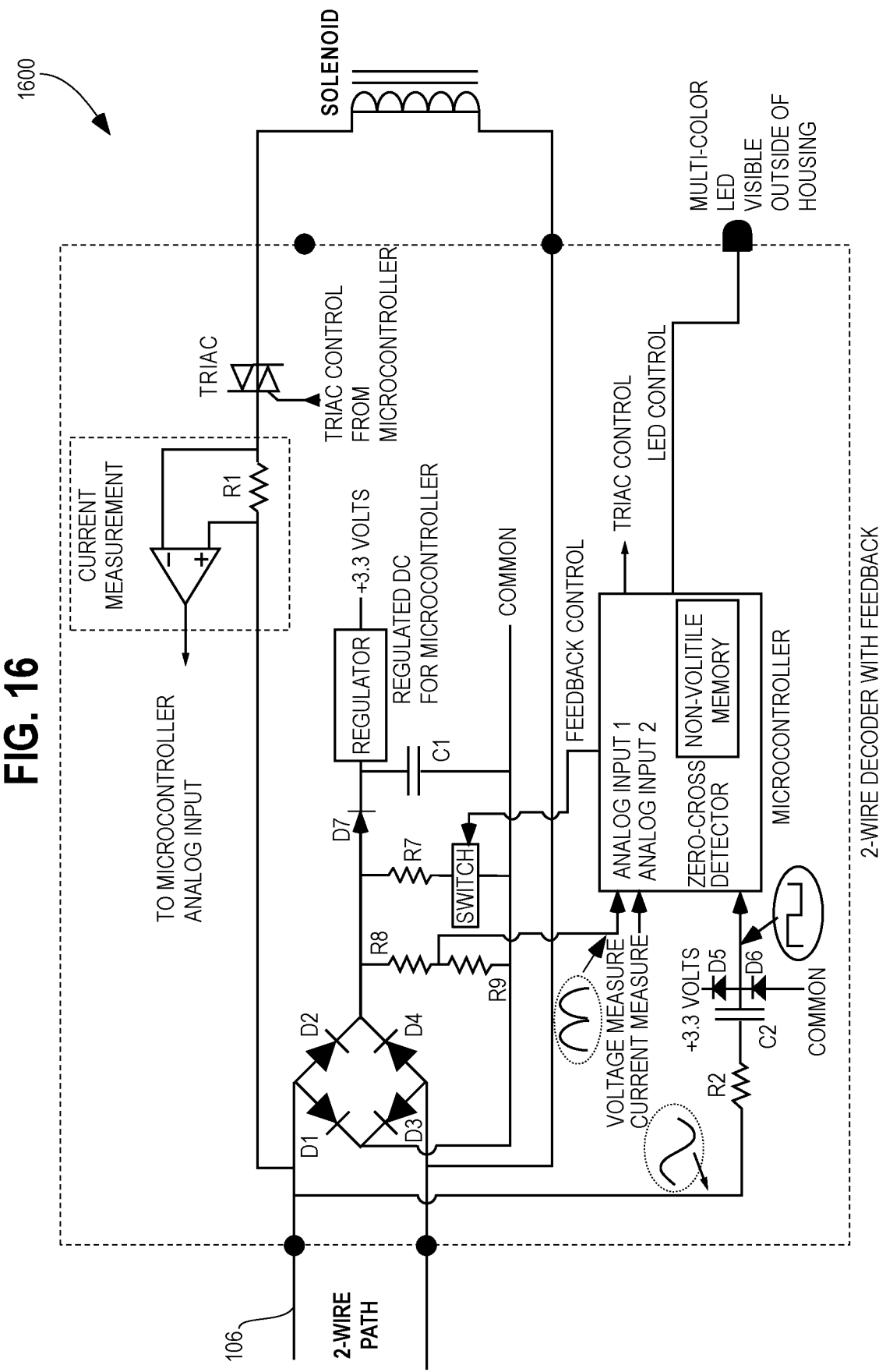
FIG. 16 illustrates a simplified block diagram of an exemplary decoder that would couple to a multi-wire path in accordance with some embodiments.
Figure 17:
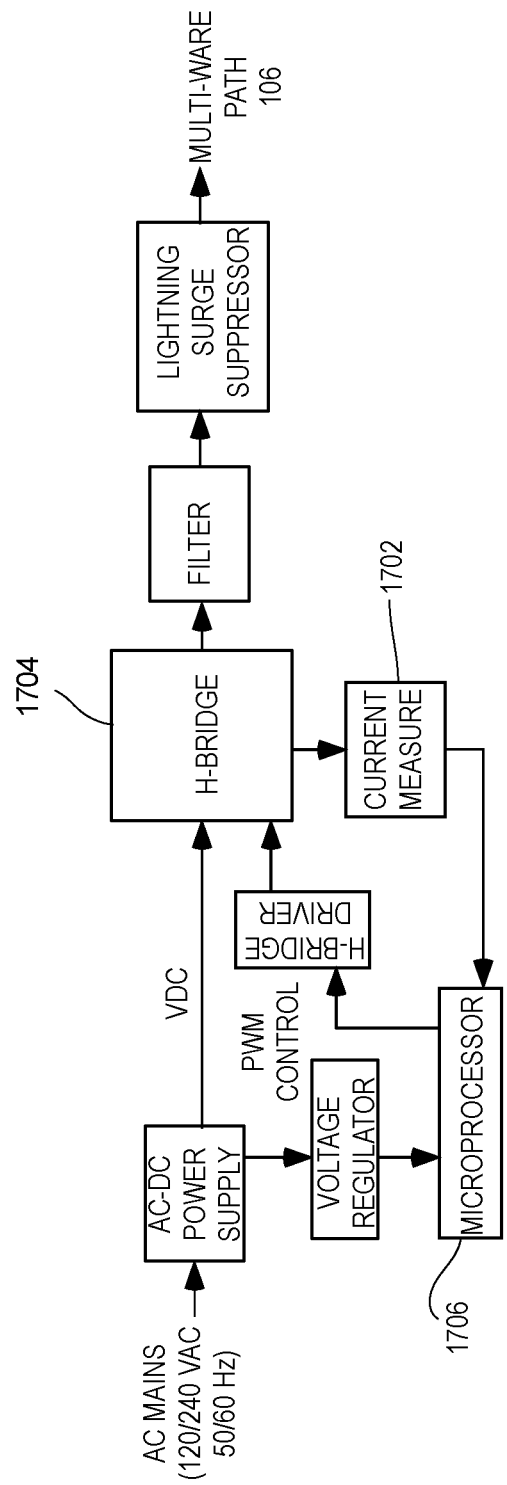
FIG. 17 illustrates a simplified block diagram of an exemplary encoder of an irrigation control unit using an H-bridge in accordance with some embodiments.

In some embodiments, any irrigation device having a unique address matching the portion of the address to match may respond during a given one of the feedback periods of time by drawing current from the multi-wire path 106 during the given one of the feedback periods of time. By one approach, the automated device discovery process executed by the control circuit may detect current drawn during the given one of the feedback periods of time and interpret the current drawn as a response from an irrigation device having a unique address matching the portion of the address to match. For example, FIG. 16 illustrates a simplified block diagram of an exemplary decoder 1600 that would couple to a multi-wire path 106 in accordance with some embodiments. For example, the decoder 1600 may provide feedback by connecting a shunt resistor R7 across the multi-wire path 106, which may cause a current increase that can be detected by a control circuit at the irrigation control unit. The diode D7 can prevent an inadvertent discharging of the capacitor C1 when the shunt resistor R7 is connected across the multi-wire path 106 via an activation of the switch by a microcontroller of the decoder 1600. One or more irrigation devices may assert this feedback during a specific bit (cycle and/or period) time corresponding to the portion of their address immediately following the address bits matched by the discovery message 702. The number of address bits contributing to the feedback bit position may be determined by the number of partitions N specified in the discovery message 702 (e.g., the portion for number of address bits to match 716). In some embodiments, an encoder (e.g., the encoder 312) of an irrigation control unit includes a current measure circuit 1702 coupled to an H-Bridge circuit 1704 that can sense and measure the current being drawn by irrigation devices (e.g., the decoder 1600) on the multi-wire path 106, e.g., in order to detect whether a decoder responded to the discovery message 702. The current measure circuit 1702 provides an output to a microcontroller 1706 (or a control circuit 305). Additional details of the decoder 1600 can be found in U.S. application Ser. No. 17/175,372 referred to above and which is incorporated herein by reference.

In some embodiments, an automated device discovery process executed by the control circuit determines that no responses are provided by any of the irrigation devices in response to the discovery message 702. By one approach, the control circuit may determine a next portion of the address to match and/or cause the modulator to modulate data including a next discovery message on the output power signal. The next discovery message may indicate the next portion of the address to match and prompt a response from at least one of the one or more of the irrigation devices in which a corresponding portion of the unique address matches the next portion of the address to match.

In some embodiments, an automated device discovery process executed by the control circuit may cause the modulator to modulate data including an initial discovery message on the output power signal to be transmitted prior to the discovery message. By one approach, the initial discovery message may prompt a response from each of the irrigation devices connected to the multi-wire path 106. In some configurations, the initial discovery message may prompt the response from each of the irrigation devices connected to the multi-wire path 106 in a respective one of a plurality of feedback periods of time. In some configurations, the automated device discovery process may end when a complete address is matched for each of the one or more of the irrigation devices connected to the multi-wire path 106 after multiple iterations of the discovery message 702 being sent. In some embodiments, each iteration indicates a respective portion of the address to match and prompts a respective response from the irrigation devices in which a corresponding portion of the unique address matches the respective portion of the address to match.

To illustrate, FIGS. 15A-B show an illustrative non-limiting example of the message format of FIG. 7 and exemplary process for automatic discovery of addresses of irrigation devices of FIG. 8, respectively, in accordance with some embodiments. A first table 1502 of FIG. 15A provides a logical view of the discovery message 702 on the multi-wire path 106 before code-word expansion and modulation as explained in FIG. 6. A second table 1504 in FIG. 15B shows the modulated bits in the first table 1502 after codeword expansion, as sent by the control circuit 305 and/or the irrigation control unit 104, 202, 318, 322 over the multi-wire path 106. The letter "H" corresponds to the determined and/or calculated corresponding Hamming parity bits. The first parameter portion 706 of the first table 1502 indicates that there are 2 feedback slots for a total of 16 feedback bits as shown in the feedback portions 712. In some embodiments, the feed-back bit position for an irrigation device is defined by the address bits immediately following the matching address bits shown in the most significant address bits to match 708 of the first table 1502. In this example, the matching address bits are in bit positions 15 through 12 (which is the hex value of F or binary 1111) as shown in the most significant address bits to match 708 in FIG. 15A. The feedback bit position is determined by the irrigation device's address bits 11 through 8 (which is the hex value of 0 or binary 0000) as shown in the most significant address bits to match 708 in FIG. 15A.

For example, FIG. 8 shows an exemplary explanatory table 800 of feedback slot assignment in accordance with some embodiments. In this example, it is intended to match the first 4 bits (1111) and the next 4 bits in the address will indicate which feedback period of time to respond, such that when a response is detected, the irrigation control unit will learn the first 8 bits of the responding device/s. To illustrate, at row 802, an irrigation device that has an address that falls in the address range 0xF000$_{hex}$ (1111 0000 0000 0000 in binary) through 0xF8FF$_{hex}$ (1111 0000 1111 1111 in binary) may indicate a response by providing a "1" in the bit 0 location of the feedback slots. The bit 0 location is determined by the irrigation device's address bits 0000 in bit locations 11 through 8, which are the four additional bits after the four matching bits (e.g., 1111).

To further illustrate, at row 804, an irrigation device that has an address that falls in the address range 0xF800$_{hex}$ (1111 1000 0000 0000 in binary) through 0xF8FF$_{hex}$ (1111 1000 1111 1111 in binary) may indicate a response by providing a "1" in the bit 8 location of the feed-back slots. The bit 8 location is determined by the irrigation device's address bits 1000 in bit locations 11 through 8, which are the four additional bits after the four matching bits (e.g., 1111).

The 16 bit address space provides several options on how to partition the address space to automatically search for and/or detect the irrigation devices with matching addresses. In an illustrative non-limiting examples, two of the several possible options are shown in FIGS. 9 and 10. FIG. 9 illustrates an exemplary process 900 for automatic discovery (auto-discovery) of addresses of irrigation devices in accordance with some embodiments. In the recursion step 1 (recursion depth 0) of FIG. 9, the discovery message does not indicate any address bits to match as indicated by a value of 0 under the column 902, and it prompts all devices connected to respond. In some embodiments, this is referred to as an initial discovery message. As such, bits in the bit locations [15 . . . 12] determine the feedback bit position as shown in the column 904. In the recursion step 2 (recursion depth 1) of FIG. 9, a next discovery message 702 indicates that there are 4 number of bits to match, which are located in bit locations [15 . . . 12]. As such, address bits in the next 3 bit locations [11 . . . 9] determine the bit position of the feedback period of time for response. As can be seen in the exemplary process 900, the 16 bit address space may be initially partitioned by 4 bits (shown in recursion step 1, address bits [15 . . . 12]), since 4 bits are needed to define 16 partitions. And since the remaining steps have 8 partitions, the address space can be subsequently partitioned by 3 bits (shown in recursion steps 2-5, address bits [11 . . . 9], [8 . . . 6], [5 . . . 3], and [2 . . . 0], respectively), since 3 bits are needed to define 8 partitions. As recursion step 5 is reached (recursion depth 4), any responding device will have matched the most significant 13 bits, and the feedback period of time used for feedback will indicate that last 3 bits of the address. At this point, the full address of responding devices in recursion step 5 will be known.

Figure 11A:
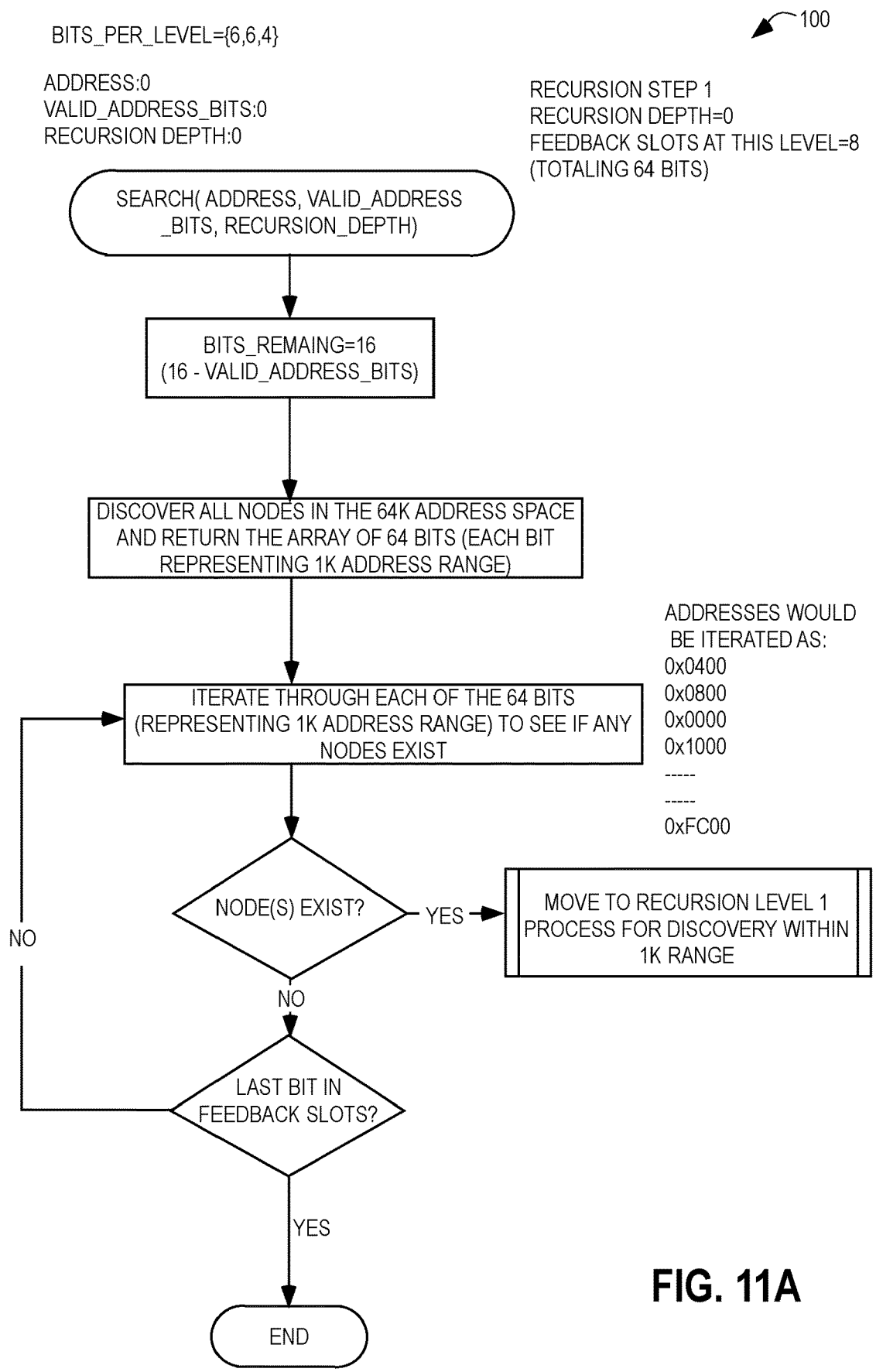
FIG. 11A-11C show flow diagrams of an exemplary process of automatic discovery of addresses of irrigation devices in accordance with some embodiments.
Figure 11B:
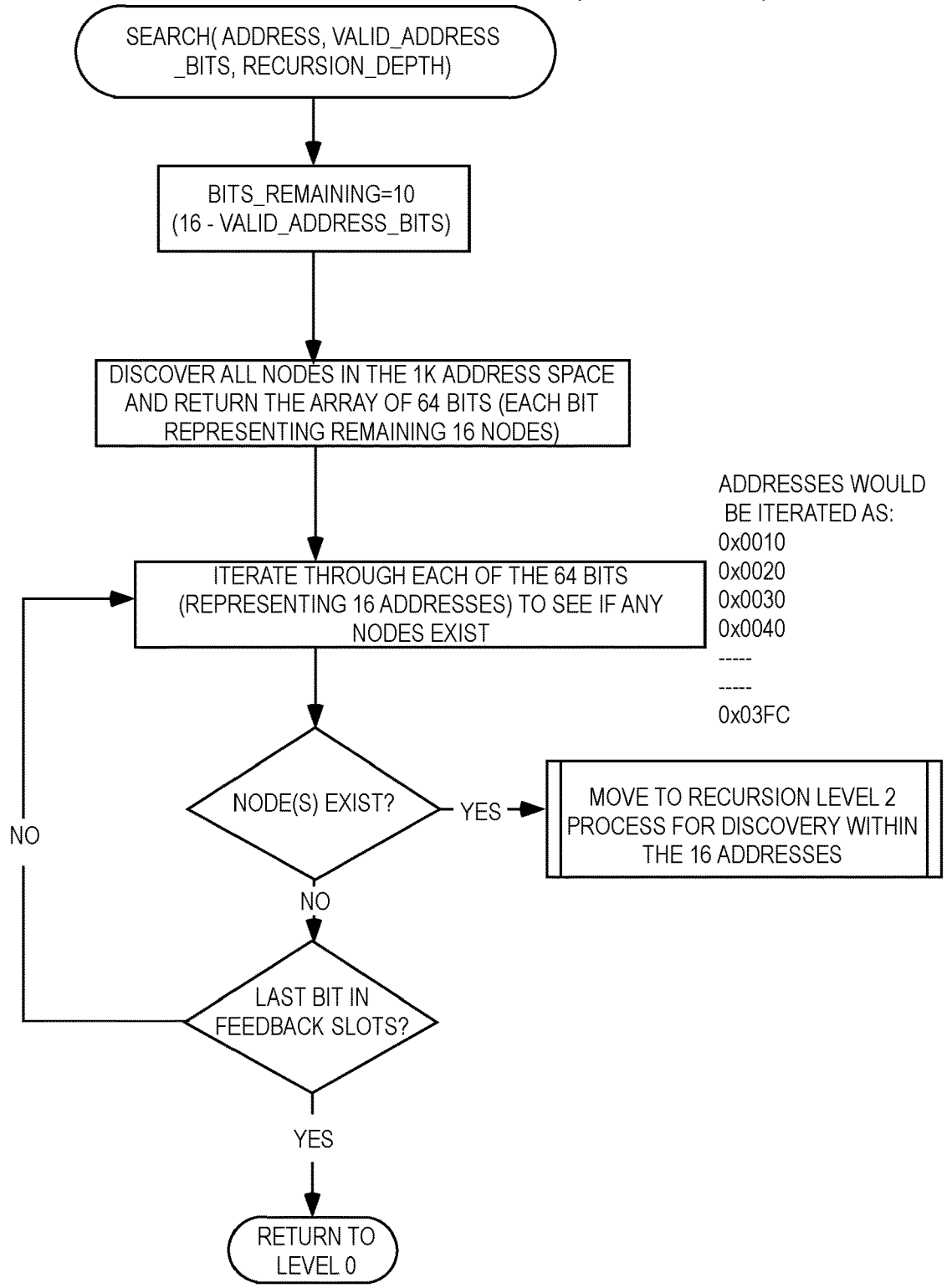
Figure 11C:
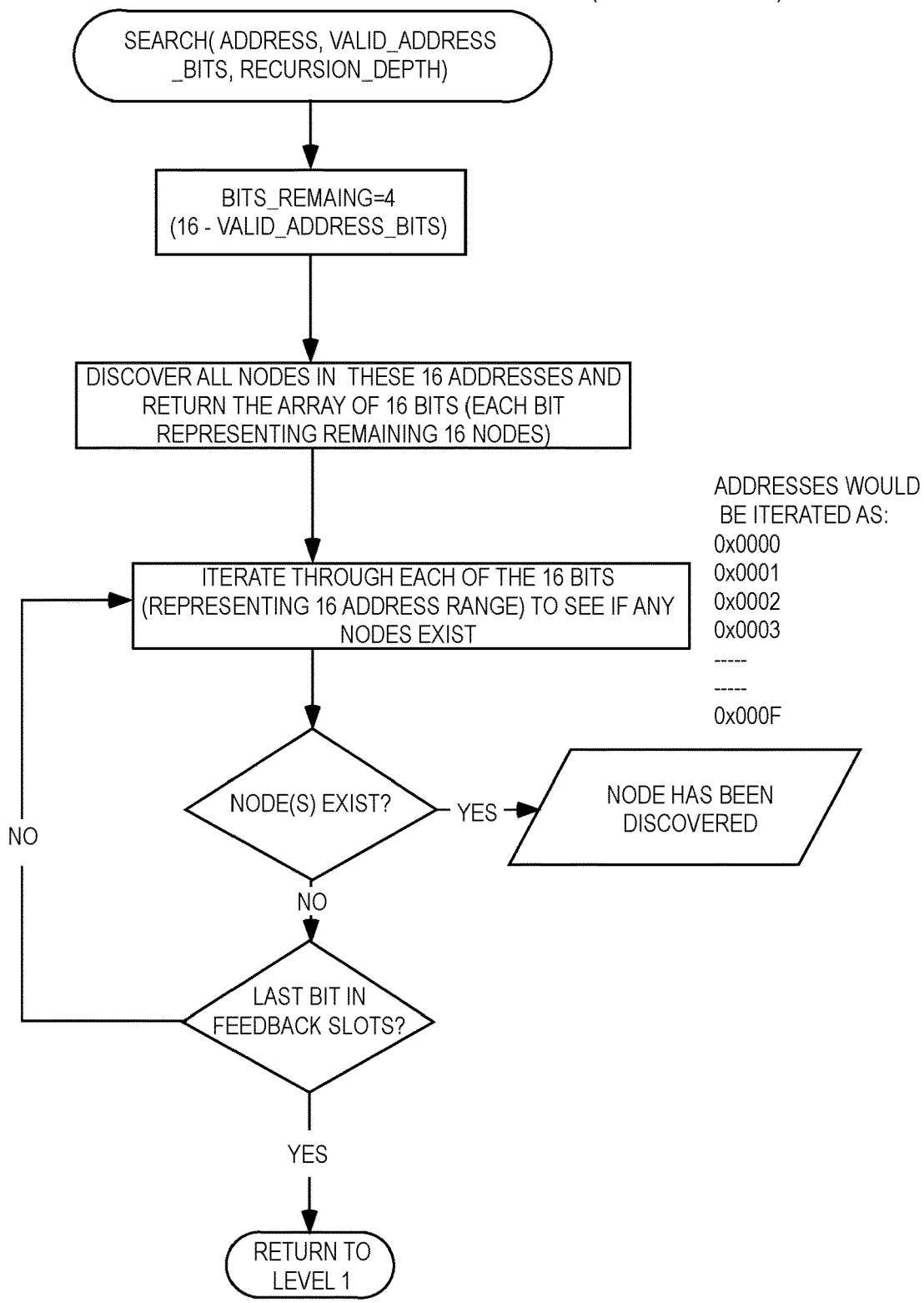

FIG. 10 illustrates an exemplary process 1000 for automatic discovery (auto-discovery) of addresses of irrigation devices in accordance with some embodiments. FIG. 10 illustrates a wider search at each step, resulting in longer commands, but a smaller search depth. As can be seen in the exemplary process 1000, the 16 bit address space may be initially partitioned by 6 bits to define 64 partitions (shown in recursion step 1 (recursion depth 0), address bits [15 . . . 10]), then partitioned by another 6 bits defining 64 partitions (shown in recursion step 2 (recursion depth 1), address bits [9 . . . 4]), and lastly partitioned by 4 bits defining 16 partitions (shown in recursion step 3 (recursion depth 2), address bits [3 . . . 0]). Each recursion step shown in FIG. 10 is illustrated in a flow diagram 1100 of an exemplary process of automatic discovery of addresses of irrigation devices in FIGS. 11A-11C. For example, FIG. 11A illustrates the recursion step 1 of FIG. 10. Similarly, FIG. 11B illustrates the recursion step 2 of FIG. 10. Moreover, FIG. 11C illustrates the recursion step 3 of FIG. 10. It is understood that other partitioning strategies are available, and that the optimal strategy may depend on the number of irrigation devices in the field and how sparsely distributed they are in the address space.

To further illustrate, FIGS. 12A and 12B shows an exemplary automatic discovery of addresses of irrigation devices in accordance with some embodiments. In this example, the discovery messages (e.g., discovery messages 702) are used to search an entire 16 bit address space for three irrigation devices having addresses 0x0001, 0x0008, and 0x5000. In an illustrative non-limiting example, pseudocode for an exemplary search algorithm for searching and detecting irrigation devices that may be executed by a control circuit to implement the exemplary auto-discovery of addresses in FIGS. 12A and 12B are shown in FIG. 14. In FIG. 14, the return value is an array of integers, one per feedback bit position, with a zero value indicating no feedback for that bit position, and a non-zero value indicating feedback was detected. In some embodiments, exemplary results of the search algorithm in FIG. 14 are a series of discovery commands and feed-back as illustrated in FIGS. 12A and 12B. In FIGS. 12A and 12B, the partitioning strategy used is the wider search as described in FIG. 10.

Referring back to FIGS. 12A and 12B, recall that in the first recursion step 1 (recursion depth 0) 1201 using the wider search strategy, there are no number of address bits to match 1202 and the address bits determining the feedback bit location (or index) are address bits location 15 through 10. As such, for the irrigation devices with addresses 0x0001 and 0x0008, their responses will be in 0 feedback slot 1206 since they have a value of 0 in their corresponding address bits determining the feedback bit location 1204. For the irrigation device with address 0x5000, its response is in the corresponding feedback slot 1208.

In recursion step 2 (recursion depth 1) 1209, the discovery message now seeks to indicate address bits to match, and in this case, it is intended to match the most significant 6 bits. Since the responses to recursion step 1 indicate at least one device responded in which the first 6 bits are 0, the value of the first 6 bits to match is defined as 000000. And like recursion step 1, 64 partitions are used for feedback position defined by the next 8 bits. In this case, the irrigation devices with addresses 0x0001 and 0x0008 respond in 0 feedback slot 1211 since they have a value of 0 in their corresponding address bits determining the feedback bit location 1205. At this point, there are still multiple possible devices that could have responded in feedback slot 1211 and a further iteration is needed to discover the complete addresses. And since the device with address 0x5000 does not match the first 6 bits, it will not respond.

In recursion step 3 (recursion depth 2) 1210, since recursion step 2 indicates the first 12 bits, the discovery message of this step signals to match the most significant 12 bits, the value of which is 0000 0000 0000. The responding irrigation devices are 0x0001 and 0x0008 and not 0x5000 since the bits to match in bit locations [15 . . . 4] are all 0s. Moreover, the response for irrigation device 0x0001 is in 1 feedback slot 1214 since it has a value of 1 in its corresponding address bits determining the feedback bit location [3 . . . 0] 1218. The response for irrigation device 0x0008 is in 8 feedback slot 1216 since it has a value of 8 in its corresponding address bits determining the feedback bit location [3 . . . 0] 1220. At this point, the irrigation control unit determines the complete addresses of the two responding devices (0x0001 and 0x0008).

What remains is to discover the device/s that responded in feedback slot 1208 in recursion step 1 (recursion depth 0)

1201. Thus, a next discovery message broadens its search relative to steps 1-3 (1201, 1209 and 1210). In another example, in recursion step 4 (recursion depth 1) 1212, the address bits to match are set to 0101 00, and the responding irrigation device is 0x5000 and not 0x0001 nor 0x0008 since the bits to match in bit locations [15 . . . 10] are 010100. The response for irrigation device 0x5000 is in 0 feedback slot 1222 since it has a value of 0 in its corresponding address bits determining the feedback bit location [9 . . . 4] 1224. At this point, there are still multiple possible devices that could have responded in feedback slot 1222 and a further iteration is needed to discover the complete addresses.

In recursion step 5 (recursion depth 2) 1221, since recursion step 4 indicates the first 12 bits, the discovery message of this step signals to match the most significant 12 bits, the value of which is 0101 0000 0000. The responding irrigation device is now only 0x5000 which responds in 0 feedback slot 1223 since it has a value of 0 in its corresponding address bits determining the feedback bit location [3 . . . 0] 1225. No other devices respond. Thus, the process is concluded since the irrigation control unit determines from the response and position the complete address of the last unknown device (0x5000).

In some embodiments, to further explain the "feedback slot" relative to the "feed-back bit location", let us revisit recursion step 3 (recursion depth 2) 1210 of FIGS. 12A and 12B. As explained above, the response for irrigation device 0x0001 is in 1 feedback slot 1214. What this mean is that the response "1" in 1214 is in bit 1 of the 16 bits shown under the column "Feed-back Bits" with bit 0 of the 16 bits being the "0" to the right of "1" in 1214. Moreover, the response "1" of the irrigation device 0x0008 in 1216 is located in bit 8 of the 16 bits. Additionally, as explained above, the number of bits under the column "Feedback Bits" for the particular recursion step is based on the feedback slot count.

In some embodiments, variations of the discovery approaches may be used. The following examples provide some example variations.

In some embodiments, one or more irrigation devices (e.g., decoders, receivers, and so on) described herein are configured to respond to an "Are you there?" type command (e.g., an embodiment of discovery message). In an illustrative non-limiting example, a control circuit, a controller, and/or a microcontroller described herein may step through a possible range of digital addresses, and ask "Are you there?" to each decoder address. For example, a discovery message is sent prompting a response if the device matches the requested address. If a response is received, this means that the device is connected and that the digital address is remembered by the control circuit, the controller, and/or the microcontroller. In some embodiments, once the control circuit, the controller, and/or the microcontroller has scanned all possible digital addresses and/or detected the maximum number of devices that the control circuit, the controller, and/or the microcontroller will support, the search is complete, and the list of remembered digital address matches the installed devices.

In some embodiments, one or more devices described herein are able to respond if their unique digital address is contained within a range of addresses. In an illustrative non-limiting example, the control circuit, the controller, and/or the microcontroller may send a command (e.g., an embodiment of discovery message) asking if any devices are present that have a digital address between a low address and a high address. By one approach, all devices that match the address range criteria may respond. In some embodiments, more than one device may respond simultaneously and their responses may collide. In some embodiments, the devices may respond in a more orderly fashion to prevent data collisions, as illustrated in one or more embodiments above, or other known ways to stagger responses. In such embodiments, the control circuit, the controller, and/or the microcontroller may recognize that at least one device responded to the command and therefore knows that at least one device has a digital address within that range. The control circuit, the controller, and/or the microcontroller may then proceed with doing a search to narrow down the exact address number of the device. In some embodiments, a binary search is used, whereby the earlier range is split in half, a subsequent command is sent asking if a device is present within the new lower range, followed by another command asking if a device is present within the new upper range. In some embodiments, other types of searches are used to sweep through the total range of addresses, as illustrated in one or more embodiments described above. By using a search technique, the control circuit, the controller, and/or the microcontroller may quickly determine the exact address of all devices that were present in the original address range. The search may continue until the control circuit, the controller, and/or the microcontroller has scanned all possible digital address ranges and/or detected the maximum number of devices that the controller may support.

In some embodiments, one or more devices may be requested by the control circuit, the controller, and/or the microcontroller to activate its corresponding solenoid and the control circuit, the controller, and/or the microcontroller detects the additional current consumption that occurs when the valve is energized, as illustrated in one or more embodiments described above. The control circuit, the controller, and/or the microcontroller may step through the possible range of digital addresses, and send a command (e.g., an embodiment of discovery message) to each possible device address to activate the corresponding solenoid. If there is a match, instead of responding to the message as described in some embodiments, the device activates it's connected solenoid. The control circuit, the controller, and/or the microcontroller may detect a change in current on the two-wire and/or the multi-wire interface and thus recognize when a device having a matching address with a solenoid attached is present. When this occurs, the corresponding digital address may be remembered by the control circuit, the controller, and/or the microcontroller. In some embodiments, once the control circuit, the controller, and/or the microcontroller has scanned all possible digital addresses, and/or detected the maximum number of devices that the control circuit, the controller, and/or the microcontroller may support, the search is complete, and the list of remembered digital address matches the installed devices.

In some embodiments, one or more devices described herein are able to activate their solenoid if their unique digital address is contained within a range of addresses and the control circuit, the controller, and/or the microcontroller detects the additional current consumption that occurs when the valve is energized. In an illustrative non-limiting example, the control circuit, the controller, and/or the microcontroller may send a command (e.g., an embodiment of discovery message) so that devices with a digital address between a low address and a high address activate their solenoid. Instead of responding to the message as described in some embodiments, all devices that match the address range criteria react by activating their solenoids. In some embodiments, more than one device may act simultaneously and the current consumption caused by the solenoids may occur at the same time. In some embodiments, one or more decoders described herein may respond in a more orderly fashion to prevent large current consumption, e.g., by delaying activations an amount of time (e.g., which may be a function of one or mot bits of their address). In some embodiments, one or more devices described herein may only briefly activate the solenoid to reduce the total current draw on the two-wire path. In such embodiments, the control circuit, the controller, and/or the microcontroller may recognize that at least one device acts based on the command and therefore knows that at least one device has a digital address within that range. By one approach, the control circuit, the controller, and/or the microcontroller may then proceed with doing a search to narrow down the exact address number of the device. In some embodiments, a binary search is used, whereby the earlier range is split in half, a subsequent command is sent asking if a device is present within the new lower range, followed by another command asking if a device is present within the new upper range. In other embodiments, other types of searches are used to sweep through the total range of addresses. By using a search technique, the control circuit, the controller, and/or the microcontroller may quickly determine the exact address of all devices that were present in the original address range. The search may continue until the control circuit, the controller, and/or the microcontroller has scanned all possible digital address ranges, and/or detected the maximum number of devices that the control circuit, the controller, and/or the microcontroller may support. In some embodiments, one or more devices described herein may only briefly activate the solenoid to reduce the total current draw on the two-wire path when they receive a range of address type command.

Assignment of Zones

Figure 18A:
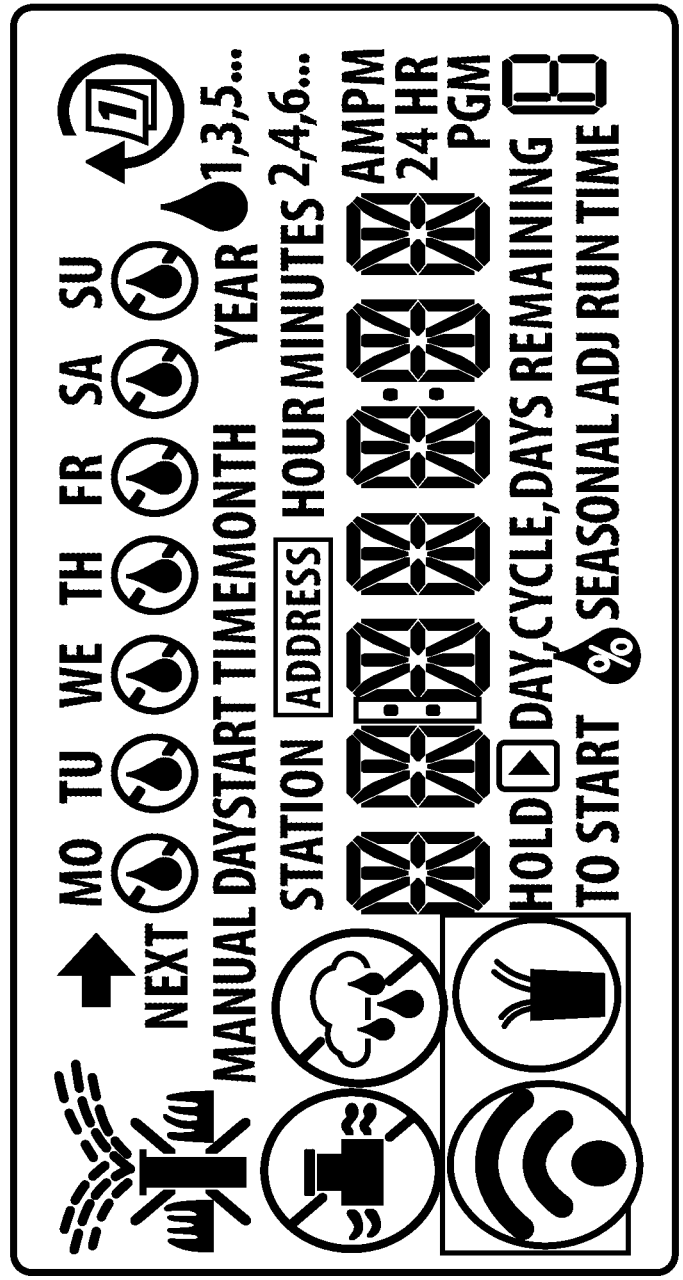
FIG. 18A shows an example user interface of an irrigation control unit in accordance with some embodiments.
Figure 18B:
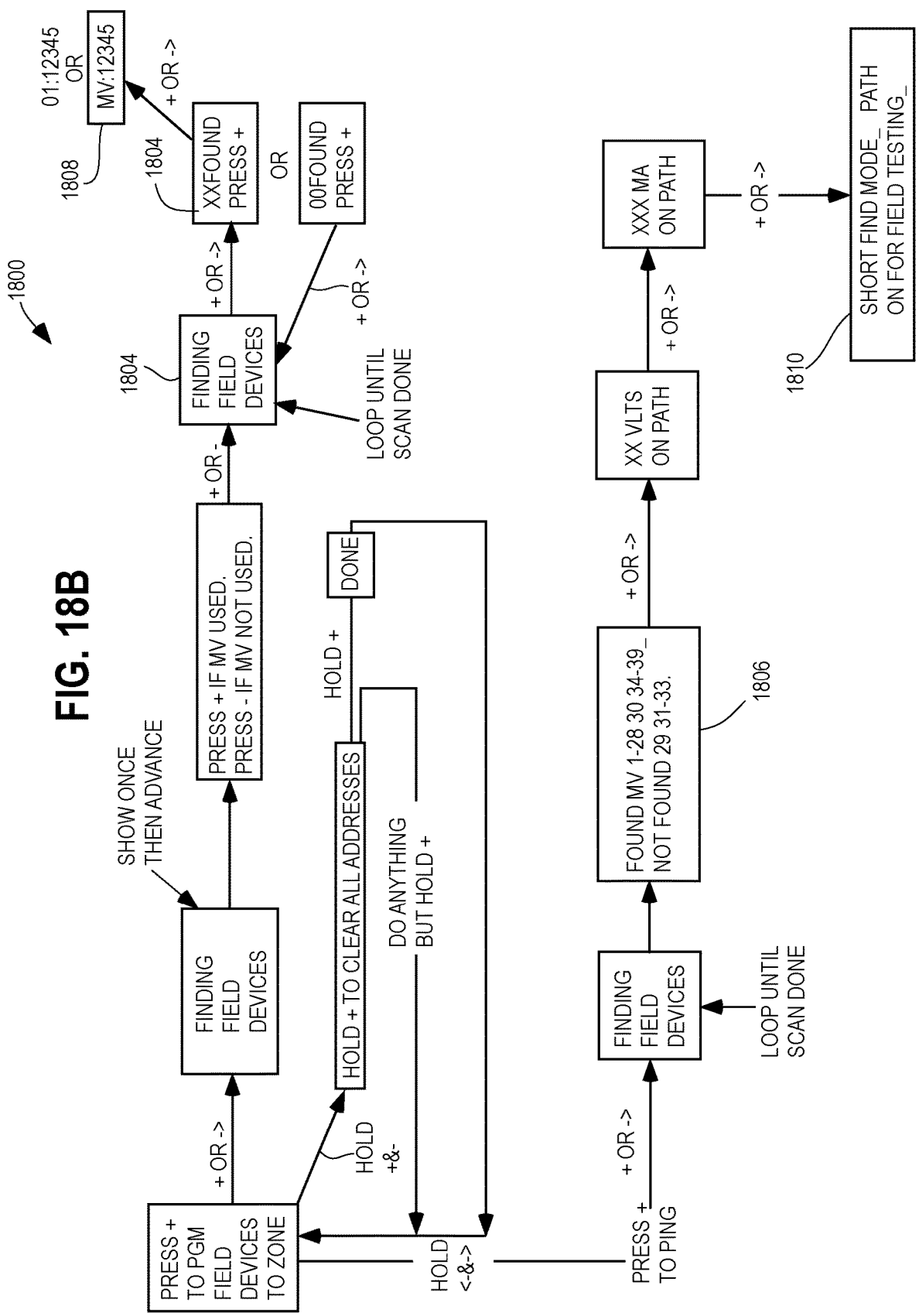
FIG. 18B illustrates an exemplary process of automatic assignment of irrigation devices to station or zone numbers in accordance with some embodiments.
Figure 19:
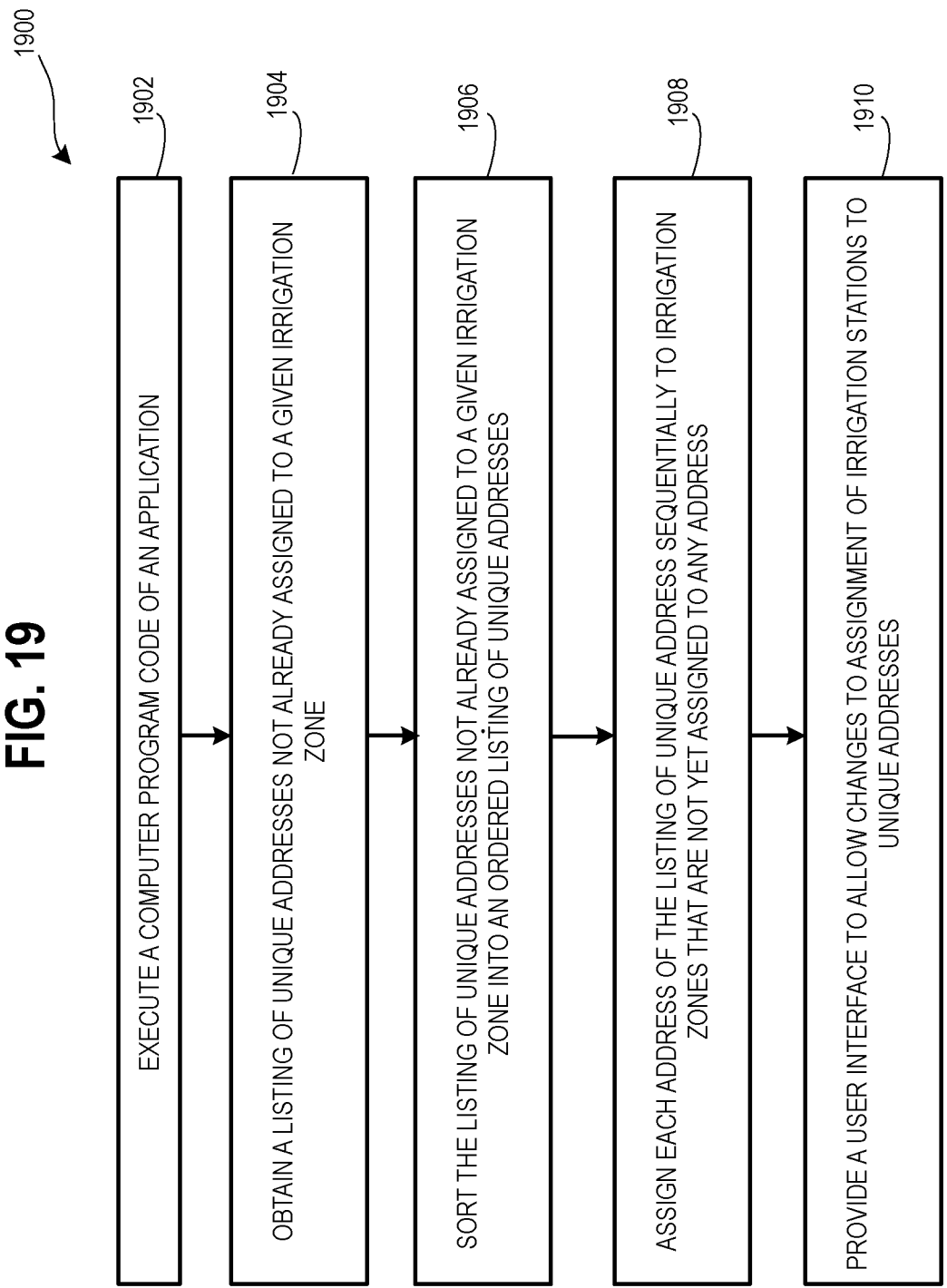
FIG. 19 shows a flow diagram of an exemplary process of automatic assignment of irrigation devices in accordance with some embodiments.

Assigning irrigation devices to available zones (e.g., to zone or station numbers) are described and illustrated in FIGS. 18A, 18B and 19. FIG. 18A shows an example user interface of an irrigation control unit in accordance with some embodiments. FIG. 18B illustrates an exemplary process 1800 of automatic assignment of irrigation devices to zones in accordance with some embodiments. FIG. 19 shows a flow diagram of an exemplary process 1900 of automatic assignment of irrigation devices in accordance with some embodiments.

In some embodiments, an irrigation control unit for use with irrigation devices connected to a multi-wire path 106 in an irrigation system includes a control circuit. In some embodiments, the irrigation control unit may correspond to the computer 102 and/or the irrigation control unit 104 of FIG. 1, the dedicated irrigation control unit 202 of FIG. 2, and/or the irrigation control units 318 and 322 of FIGS. 3A and 3B. In some embodiments, the irrigation system may correspond to the central control-based irrigation system 100 of FIG. 1. The irrigation control unit includes a control circuit that executes an application including computer program code that perform one or more steps (Step 1902). In some configurations, the computer program code may be stored in a memory (not shown). For example, the memory may include read only memory, random access memory, hard drives, solid-state drives, flash drives, and/or any storage data units and/or devices capable of storing electronic data. By one approach, a reference to a control circuit described herein may correspond to the control circuits 305 of FIGS. 3A and 3B and/or one or more control circuits associated with the computer 102 and/or the irrigation control unit 104 of FIG. 1, the dedicated irrigation control unit 202, and/or irrigation control unit 318.

In some embodiments, the control circuit, via the execution of the application, obtains a listing of unique addresses not already assigned to irrigation zones (Step 1904). In some configurations, a listing of unique addresses may be provided to the control circuit via one or more of a local memory of the irrigation control unit and/or a memory external to the irrigation control unit (e.g., a memory storage in a cloud, a flash drives, and/or any external memory storage data unit/devices that are capable of storing a listing of unique addresses associated with irrigation devices). In some embodiments, the addresses in the listing of unique addresses may be obtained and/or determined based on execution of the automated device discovery process described herein. In some embodiments, the addresses in the listing of unique addresses are obtained using traditional methods of acquiring new addresses, such as through manual entry and/or scanning of optical codes and/or reading of electronic labels of the devices. In some configurations, each unique address may correspond to a respective one of irrigation devices connected to a multi-wire path 106 of an irrigation system. In some embodiments, the control circuit, via the execution of the application, assigns each unique address of the listing of unique addresses sequentially to available irrigation zones (Step 1908).

In some embodiments, the assignment of each unique address step includes assigning each unique address of the listing of unique addresses sequentially to available irrigation zones starting with a lowest value of the available irrigation zones assigned to a lowest value of the listing of unique addresses. For example, in the example of FIGS. 12A and 12B above, a listing of unassigned addresses 0x0008, 0x0001, and 0x5000 could be assigned to the available zones 1, 2 and 3. For further example, if zones 1, 2, and 3 were already assigned to addresses, unassigned addresses 0x0008, 0x0001, and 0x5000 could be assigned to the available zones 4, 5 and 6. In some embodiments, the assignment of each unique address includes assigning each unique address of the listing of unique addresses sequentially to available irrigation zones such that a unique address corresponding to a master valve is assigned a lowest number of the available irrigation zones. For example, a listing of unassigned addresses 0x0008, 0x0001, and 0x5000 and including a master valve (MV) having address 0x1040 could be assigned such that MV address 0x1040 is assigned to available zone 1 and unassigned addresses 0x0008, 0x0001, and 0x5000 are assigned to available zones 2, 3 and 4. It is noted that in some embodiments, sequential assignments can be in ascending, descending or other order.

In some embodiments, the control circuit, via the execution of the application, sorts the listing of unique addresses not already assigned to the irrigation zones into an ordered listing of unique addresses (Step 1906). By one approach, the assign step may include assigning each unique address of the ordered listing of unique addresses sequentially to available irrigation zones. For example, a listing of unassigned addresses 0x0008, 0x0001, and 0x5000 could be first sorted into an ordered listing of unassigned addresses 0x0001, 0x0008, and 0x5000, which then are assigned to the available zones 1, 2 and 3. It is noted that Step 1906 is optional in some embodiments.

In some embodiments, available irrigation zones includes one or both of: one or more irrigation zones that have not yet been assigned to any unique address and one or more lost irrigation zones that were previously assigned to a unique address of an irrigation device that is no longer connected to the multi-wire path 106. For example, if zones 1, 2 and 3 have been assigned, but the address corresponding to zone 2 is missing or not functioning properly such that it appears to be disconnected, then three unassigned addresses could be assigned to zones 2, 4 and 5.

In some embodiments, the one or more steps executed by the control circuit includes determining the listing of unique addresses not already assigned to the irrigation zones. The one or more steps may include receiving a listing of all unique addresses detected as being connected to the multi-wire path 106 and/or removing unique addresses already assigned to a respective irrigation zone from the listing of all unique addresses resulting in the listing of unique addresses not already assigned to the irrigation zones.

In some embodiments, the one or more steps executed by the control circuit includes outputting of control signals to cause a display of the listing of unique addresses having been assigned to the available irrigation zones via a display 1802 of an example user interface shown in FIG. 18A. Such a user interface would also include user input devices (not shown) to input data and/or to interact with the data displayed on the display 1802. For example, the user input devices include buttons, dials, and/or switches, to name a few. In some configurations, the irrigation control unit includes a user interface that receives one or more user inputs. In some embodiments, the assignments of irrigation devices (e.g., decoders) to zones or station numbers is displayed on a portable user device (not shown), such as a smartphone, tablets, laptops, and/or the like, instead of through the display 1802.

FIG. 18B illustrates example user input devices and messages shown on a display of an example user interface. In some embodiments, the process of assigned addressed not already assigned to irrigation zones is automated to simply the process and speed up programming. In embodiments, when there are many devices that may connect to the multi-wire path and/or where the user interface of the irrigation controller is limited, this can result in significant time savings and reduction in error/s. In an exemplary practical application, an installer can arrange the irrigation devices in a desired order and install them in that order, then allow the irrigation control unit to automatically assign those addresses to available zones sequentially. In embodiments where the listing of addresses is sorted and ordered, the installer could choose to install devices in sequential address order so that the zone assignments would sequentially match the installation order.

In some embodiments, as illustrated in FIG. 18B, the one or more steps includes receiving user input via a user interface including the display 1802 (of FIG. 18A) and other inputs or buttons, e.g., notes "+", "−", left, and right arrow buttons. In some configurations, the user input may indicate to change an irrigation zone assignment of a first irrigation zone assigned to a first unique address to a second irrigation zone assigned to a second unique address. Alternatively or in addition to, the one or more steps may include switching the irrigation zone assignment such that the first irrigation zone is assigned to the second unique address and the second irrigation zone is assigned to the first unique address.

In some embodiments, the one or more steps includes receiving user input via the user interface 1802. The user input may indicate to change an irrigation zone assignment of a first irrigation zone assigned to a first unique address. In some embodiments, the user input indicates removing an irrigation zone assignment of a first irrigation zone assigned to a first unique address, such that the first unique address is not assigned to an irrigation zone. In some embodiments, an additional user input may be received via the user interface 1802. The additional user input may indicate assignment of the first unique address to an available irrigation zone. In some embodiments, the user interface 1802 is provided to allow changes to assignment of irrigation stations to unique addresses (Step 1910).

In some embodiments, the user interface 1802 receives a first user input causing the control circuit to execute the steps described herein. For example, the steps may include initiating execution of an automated device discovery process to detect all unique addresses of devices connected to the multi-wire path 106. In some embodiments, the listing of unique addresses not already assigned to irrigation zones matches a listing of all unique addresses detected as being connected to a multi-wire path 106 or is a subset of the listing of all unique addresses detected as being connected to the multi-wire path 106.

In some embodiments, the execution of the automated device discovery process causes a modulator to modulate data including iterations of discovery messages on an output power signal such as described herein in other embodiments. Each discovery message may indicate a respective portion of an address to match and prompt a response from one or more of the irrigation devices in which a corresponding portion of the unique address matches the respective portion of the address to match. The responses to each iteration of the discovery message may result in a modification of the respective portion of the address to match for subsequent discovery messages. The automated device discovery process of some embodiments may end when a complete unique address is matched for each of the irrigation devices connected to the multi-wire path.

Figure 20:
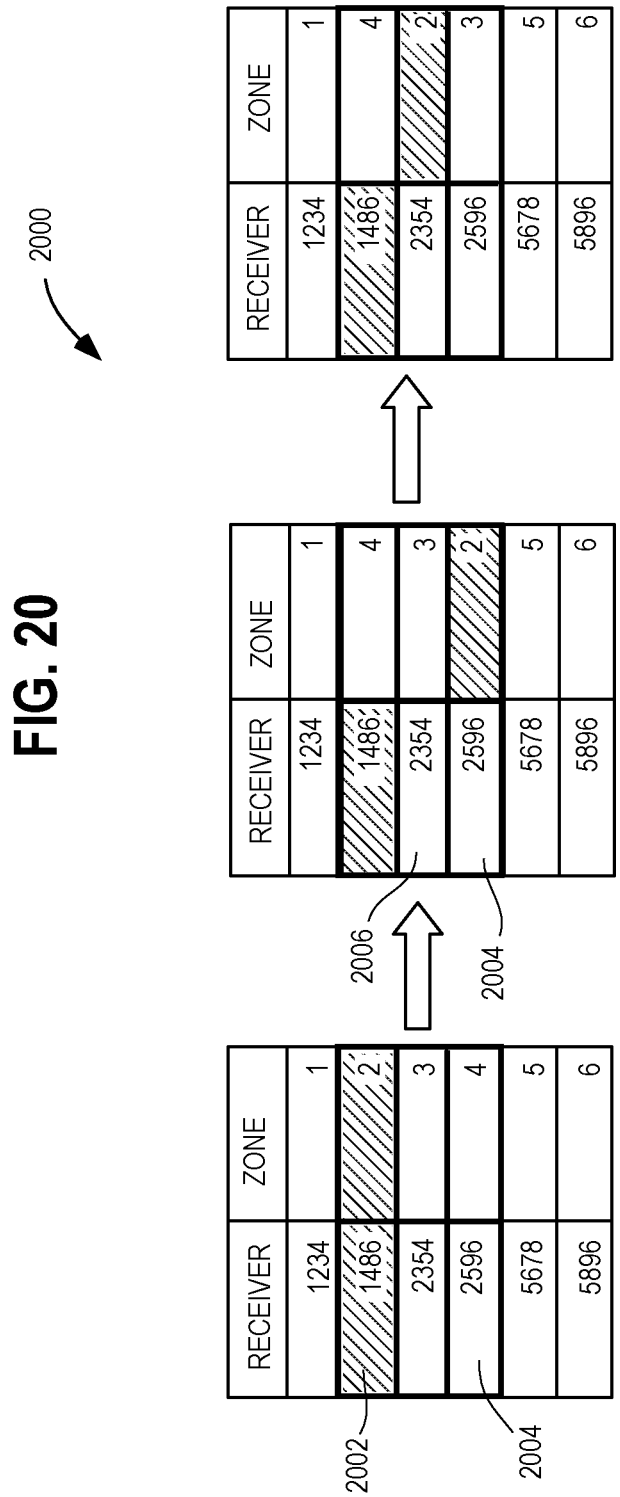
FIG. 20 illustrates an exemplary process of swapping zone number assignments between irrigation devices and/or addresses in accordance with some embodiments.

In some embodiments, the irrigation control unit may include a panel having a user interface with a display 1802 and that receives one or more user inputs, e.g., via buttons, switches, dials, and so on. In some embodiments, the assignment of decoders may be performed on a portable user device (not shown), such as a smartphone, tablets, laptops, and/or the like. For example, the user interface can be implemented in part or in while using a mobile application being executed by a mobile electronic device directly or indirectly connected to the irrigation control unit (e.g., similar to the mobile application 210 being executed by the mobile electronic device 212 shown in FIG. 2.) In the exemplary process 1800, at step 1804, the irrigation control unit 318 may scan addresses of irrigation devices that are connected and/or coupled to the multi-wire path 106. At step 1804, the irrigation control unit 318 may automatically assigns addresses to available station numbers. At step 1806, during the scan, the irrigation control unit 318 receives responses from coupled irrigation devices and based on the responses, determines whether station numbers are available or not. At step 1808, the irrigation control unit 318 may prompt a user to provide one or more user inputs that causes assignment of decoders to available station numbers. In some embodiments, at 1908, the irrigation control unit receives a user input that causes the irrigation control unit 318 to swap zones or station number assignments between irrigation devices and/or addresses. FIG. 20 illustrates an exemplary process 2000 of swapping zone number assignments between irrigation devices (receivers) and/or addresses in accordance with some embodiments. For example, the zones automatically assigned to the addresses of receivers 2002 and 2004 (having addresses 1486 and 2596) are swapped. In another example, the zones between receivers 2004 and 2006 (having addresses 2354 and 2596) are then subsequently swapped.

In some embodiments, at step 1804, in response to scanning addresses of irrigation devices, the irrigation control unit 318 automatically assigns addresses to the lowest never assigned station number. The irrigation control unit 318 may assign addresses in ascending order, with the master valve (if used) getting the lowest address. In some embodiments, if there are zero never-used station numbers and zero abandoned (lost) station numbers, then new addresses will not get assigned. In some embodiments, if there are no never-used station numbers, but there are lost station numbers, then new addresses will be assigned to the lowest lost station number. In some embodiments, the irrigation control unit 318 displays up to 10 more than the max allowed address (for example, 50 or 51 depending on master valve used or not), but displays the station number for these as "--". In some embodiments, the irrigation control unit 318 reports the total addresses found, which includes the 10 over the limit, but excludes any that are assigned to stations but not found by the scan.

In some embodiments, at step 1806, the irrigation control unit 318 continues scanning for addresses of irrigation devices that are connected and/or coupled to the multi-wire path 106 until a user input via the user interface is received. For example, the user may press on the "-->" or "+" inputs or buttons. At step 1806, for example, the stations that have addresses and that responded are found. In another example, the stations that have assigned addresses and do not respond are not found. In yet another example, if new addresses are found, the stations are assigned to the highest never assigned station.

In some embodiments, at step 1808, for addresses that are found, station number (or MV) will flash in a slow pattern and the address will be solid. In some embodiments, if an assigned station's address is not found, then the station number will remain solid and the address will rapidly alternate between the address value and "LOST". In some embodiments, a user may use "<-" and "->" to cycle through the addresses. In some embodiments, a user may use "+/−" to edit the station number. In some embodiments, the address numbers themselves may not be edited. In some embodiments, when a station number is edited, the irrigation control unit 318 will swap the address to another station number. In some embodiments, the address swap will not occur until the user does one of the following: press the Next button, press the Back button, or turn the dial button. In some embodiments, swapping includes swapping of blank addresses, swapping of lost addresses, and/or swapping of "--" addresses, which are address over the 50 station limit. By one approach, swapping may wrap around 1 to 50 (or the highest "--" address).

Figure 21:
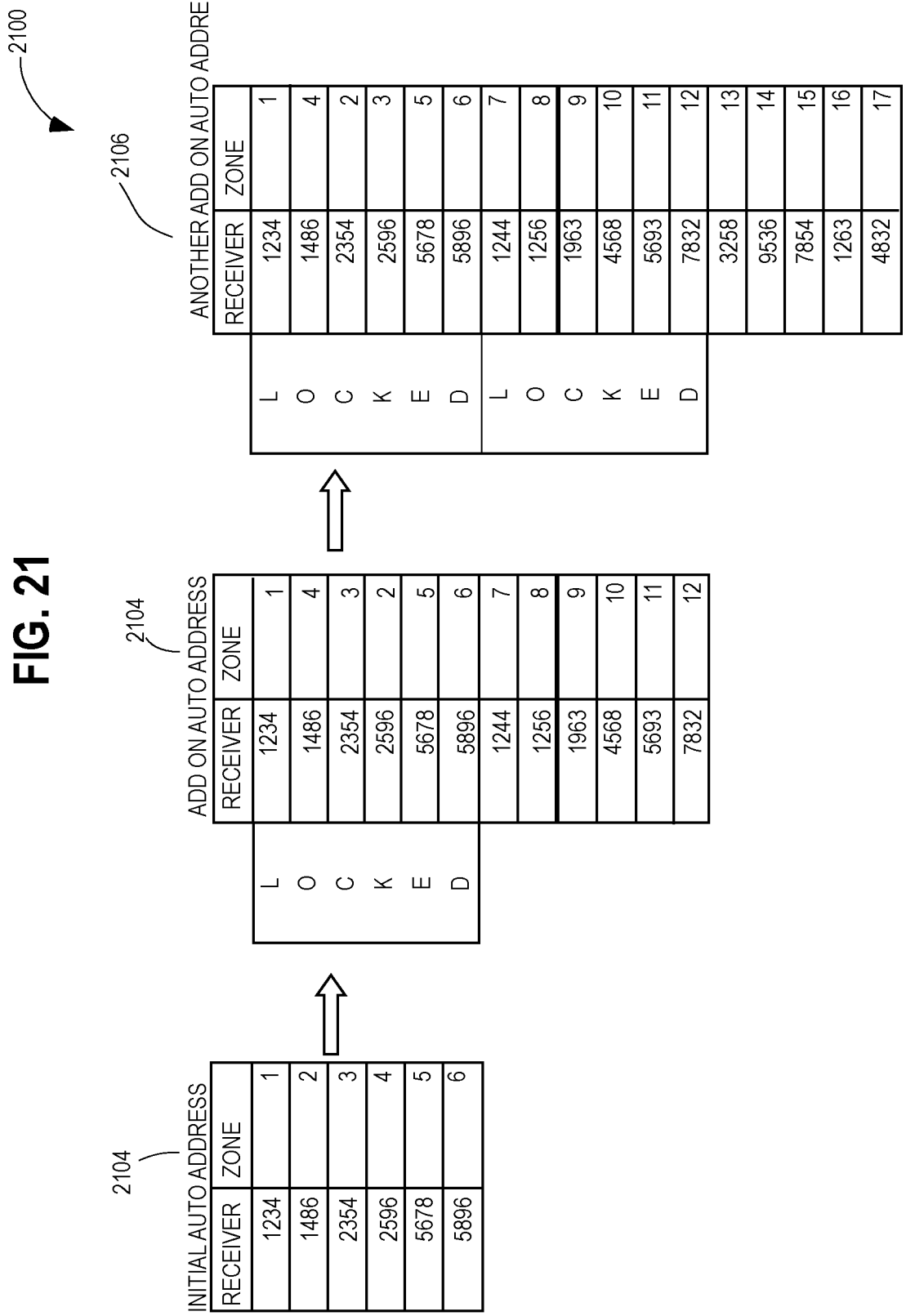
FIG. 21 illustrates an exemplary process of locking a set of zone number assignments with a set of irrigation devices in accordance with some embodiments.

FIG. 21 illustrates an exemplary process 2100 of locking a set of zone assignments with a set of irrigation devices once they are automatically assigned in accordance with some embodiments. In a first installation 2102, 6 devices are installed and these addresses are automatically assigned to available zones 1-6. The installer then reassigns the zones assigned to addresses 1486, 2354, and 2596 as shown in FIG. 16. At a later point in time, during a second installation 2104, 6 additional devices are installed and connected to the multi-wire path. Whether an automatic discovery process is executed or the new addresses are otherwise provided, the addresses of devices already assigned to zones is locked, and new automatic assignment of addresses to zones applies only to the newly installed addresses. That is, the assignments of the locked devices is not disturbed with the new installation 2104. And likewise, during a third installation 2106, 5 additional devices are installed and connected to the multi-wire path. The addresses of the 12 devices already assigned to zones is locked, and new automatic assignment of addresses to zones applies only to the newly installed 5 addresses.

In some embodiments, at step 1810, the irrigation control unit may receive a user input that causes the irrigation control unit to provide a fixed current over the multi-wire path 106 in order for a user to search for short along the multi-wire path 106. For example, the user may use a clamp meter on the multi-wire path 106 and/or splices to search for a short.

Figure 22:
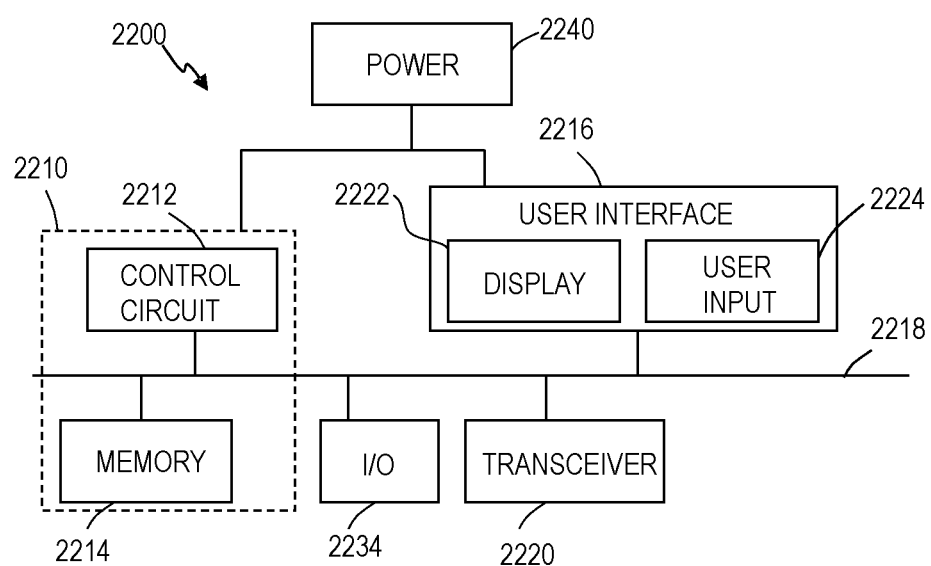
FIG. 22 illustrates an exemplary system for use in implementing methods, techniques, devices, apparatuses, systems, servers, sources and providing control over irrigation, in accordance with some embodiments.

FIG. 22 illustrates an exemplary system 2200 that may be used for implementing any of the components, circuits, circuitry, systems, functionality, apparatuses, processes, or devices of the computer (e.g., the computer 102), irrigation control units (e.g., irrigation control units 104, 202, 318 and 320, and/or other above or below mentioned systems or devices, or parts of such circuits, circuitry, functionality, systems, apparatuses, processes, or devices.

By way of example, the system 2200 may comprise a control circuit 2212 or processor/microcontroller module, memory 2214, and one or more communication links, paths, buses or the like 2218. While memory 2214 is illustrated as separate from the control circuit 2212, in some embodiments, some or all of the memory 2214 in integral with the control circuit 2212. Some embodiments may include one or more user interfaces 2216, and/or one or more internal and/or external power sources or supplies 2240. The control circuit 2212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 2212 can be part of control circuitry and/or a control system 2210, which may be implemented through one or more processors with access to one or more memory 2214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 2200 may be used to implement one or more of the above or below, or parts of, components, circuits, systems, processes and the like.

Some embodiments include a user interface 2216 can allow a user to interact with the system 2200 and receive information through the system. In some instances, the user interface 2216 includes a display 2222 and/or one or more user inputs 2224, such as buttons, touch screen, track ball, keyboard, mouse, etc., which can be part of or wired or wirelessly coupled with the system 2200. Typically, the system 2200 further includes one or more communication interfaces, ports, transceivers 2220 and the like allowing the system 2200 to communicate over a communication bus, a distributed computer and/or communication network (e.g., a local area network (LAN), the Internet, wide area network (WAN), etc.), communication link 2218, other networks or communication channels with other devices and/or other such communications or combination of two or more of such communication methods. Further the transceiver 2220 can be configured for wired, wireless, optical, fiber optical cable, satellite, or other such communication configurations or combinations of two or more of such communications.

Some embodiments include one or more input/output (I/O) ports 2234 that allow one or more devices to couple with the system 2200. The I/O ports can be substantially any relevant port or combinations of ports, such as but not limited to USB, Ethernet, or other such ports. The I/O interface 2234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 2200 comprises an example of a control and/or processor-based system with the control circuit 2212. Again, the control circuit 2212 can be implemented through one or more processors, controllers, central processing units, logic, software and the like. Further, in some implementations the control circuit 2212 may provide multiprocessor functionality.

The memory 2214, which can be accessed by the control circuit 2212, typically includes one or more processor-readable and/or computer-readable media accessed by at least the control circuit 2212, and can include volatile and/or nonvolatile media, such as RAM, ROM, EEPROM, flash memory and/or other memory technology. Further, the memory 2214 is shown as internal to the control system 2210; however, the memory 2214 can be internal, external or a combination of internal and external memory. Similarly, some or all of the memory 2214 can be internal, external or a combination of internal and external memory of the control circuit 2212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 2214 can store code, software, executables, scripts, data, content, lists, programming, programs, log or history data, user information, customer information, product information, and the like. While FIG. 22 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An irrigation control unit for use with irrigation devices connected to a multi-wire path in an irrigation system comprising:
    a modulator configured to provide an output power signal modulated with data;
    a multi-wire interface coupled to the modulator and configured to electrically couple to the multi-wire path extending into a landscape and to which the irrigation devices are connected, the irrigation devices each having a unique address and configured to derive operational power from the output power signal and demodulate the data; and
    a control circuit coupled to the modulator and configured to execute an automated device discovery process configured to:
        cause the modulator to modulate data comprising a discovery message on the output power signal, the discovery message indicating a portion of an address to match and prompting a response from one or more of the irrigation devices in which a corresponding portion of the unique address matches the portion of the address to match,
    wherein the discovery message comprises a data portion defining a number of address bits in the portion of the address to match and defining a value of the address bits of the portion of the address to match.

2. The irrigation control unit of claim 1, wherein the discovery message is encoded onto the output power signal.

3. The irrigation control unit of claim 2, wherein a synchronization preamble and error detection bits are encoded with the discovery message onto the output power signal.

4. The irrigation control unit of claim 1, wherein the discovery message further comprises a feedback portion defining a number of feedback periods of time for the irrigation devices matching the portion of the address to respond.

5. The irrigation control unit of claim 1, wherein, subsequent to a transmission of the modulated data, the control circuit is further configured to cause the modulator to provide over the multi-wire path one or more first idle signals corresponding to a feedback period of time the control circuit has allocated to receive the response from the one or more of the irrigation devices.

6. The irrigation control unit of claim 5, wherein, subsequent to the transmission of the one or more first idle signals, the control circuit is further configured to cause the modulator to provide over the multi-wire path at least one synchronization signal for the irrigation devices.

7. The irrigation control unit of claim 1, wherein the automated device discovery process executed by the control circuit is configured to:
    detect one or more responses from the one or more of the irrigation devices in which the corresponding portion of the unique address matches the portion of the address to match;
    determine, based on the detected one or more responses, a next portion of the address to match; and
    cause the modulator to modulate data comprising a next discovery message on the output power signal, the next discovery message indicating the next portion of the address to match and prompting a next response from at least one of the one or more of the irrigation devices in which the corresponding portion of the unique address matches the next portion of the address to match.

8. The irrigation control unit of claim 7, wherein the next portion of the address to match comprises one of:
    the portion of the address to match having been matched together with another portion of the address to match, such that a narrower range of addresses is targeted by the next discovery message; and
    another portion of the address to match, such that a broader range of addresses is targeted by the next discovery message.

9. The irrigation control unit of claim 1, wherein the automated device discovery process executed by the control circuit is configured to:

cause the modulator to modulate data comprising idle portions on the output power signal subsequent to the discovery message, the idle portions corresponding to feedback periods of time for the irrigation devices to respond; and detect one or more responses from the one or more of the irrigation devices in one or more of the feedback periods of time, wherein the one or more responses indicate a presence of the irrigation devices on the multi-wire path having unique addresses matching the portion of the address to match.

10. The irrigation control unit of claim 9, wherein any irrigation device having the unique address matching the portion of the address to match is configured to respond during a given one of the feedback periods of time by drawing current from the multi-wire path during the given one of the feedback periods of time, and wherein the automated device discovery process executed by the control circuit is configured to:

detect current drawn during the given one of the feedback periods of time and interpret the current drawn as a response from an irrigation device having the unique address matching the portion of the address to match.

11. The irrigation control unit of claim 1, wherein the automated device discovery process executed by the control circuit is configured to:

determine that no responses are provided by any of the irrigation devices in response to the discovery message;

determine a next portion of the address to match; and cause the modulator to modulate data comprising a next discovery message on the output power signal, the next discovery message indicating the next portion of the address to match and prompting a response from at least one of the one or more of the irrigation devices in which the corresponding portion of the unique address matches the next portion of the address to match.

12. The irrigation control unit of claim 1, wherein the automated device discovery process executed by the control circuit is configured to cause the modulator to modulate data comprising an initial discovery message on the output power signal to be provided prior to the discovery message, the initial discovery message prompting a response from each of the irrigation devices connected to the multi-wire path.

13. The irrigation control unit of claim 12, wherein the initial discovery message prompting the response from each of the irrigation devices connected to the multi-wire path in a respective one of a plurality of feedback periods of time.

14. The irrigation control unit of claim 1, wherein the automated device discovery process ends when a complete address is matched for each of the one or more of the irrigation devices connected to the multi-wire path after multiple iterations of the discovery message being sent, each iteration indicating a respective portion of the address to match and prompting a respective response from the irrigation devices in which the corresponding portion of the unique address matches the respective portion of the address to match.

15. An irrigation control unit for use with irrigation devices connected to a multi-wire path in an irrigation system comprising:

a modulator configured to provide an output power signal modulated with data;

a multi-wire interface coupled to the modulator and configured to electrically couple to the multi-wire path extending into a landscape and to which the irrigation devices are connected, the irrigation devices each having a unique address and configured to derive operational power from the output power signal and demodulate the data; and a control circuit coupled to the modulator and configured to execute an automated device discovery process configured to cause the modulator to modulate the data comprising a discovery message on the output power signal, the discovery message indicating a portion of an address to match and prompting a response from one or more of the irrigation devices in which a corresponding portion of the unique address matches the portion of the address to match, wherein the discovery message comprises a first data portion and a second data portion, wherein the first data portion corresponds to the portion of the address to match and the second data portion corresponds to feedback periods of time for each of one or more of the irrigation devices to respond, and wherein the first data portion defines a first set of address bits to match and a position of the first set of address bits in the address, and wherein the second data portion defines a set of feedback periods of time, each feedback period of time corresponding to a second set of address bits and a position of the second set of address bits in the address.

16. The irrigation control unit of claim 15, wherein a feedback period of time for use by each of the one or more of the irrigation devices depends on an additional portion of the unique address of each of the one or more of the irrigation devices.

17. The irrigation control unit of claim 15, wherein when a given irrigation device responds to the discovery message during a given feedback period of time, the response indicates that the given irrigation device matches the first set of address bits and indicates the second set of address bits of the given irrigation device.

18. The irrigation control unit of claim 15, wherein the first data portion defines a number of address bits to match.

19. The irrigation control unit of claim 15, wherein the automated device discovery process executed by the control circuit is configured to:

detect one or more responses from the one or more of the irrigation devices in which the corresponding portion of the unique address matches the portion of the address to match;

determine, based on the detected one or more responses, a next portion of the address to match; and cause the modulator to modulate data comprising a next discovery message on the output power signal, the next discovery message indicating the next portion of the address to match and prompting a next response from at least one of the one or more of the irrigation devices in which the corresponding portion of the unique address matches the next portion of the address to match.

20. The irrigation control unit of claim 19, wherein the next portion of the address to match comprises one of:

the portion of the address to match having been matched together with another portion of the address to match, such that a narrower range of addresses is targeted by the next discovery message; and another portion of the address to match, such that a broader range of addresses is targeted by the next discovery message.

21. The irrigation control unit of claim 15, wherein the automated device discovery process executed by the control circuit is configured to:

cause the modulator to modulate data comprising idle portions on the output power signal subsequent to the discovery message, the idle portions corresponding to feedback periods of time for the irrigation devices to respond; and detect one or more responses from the one or more of the irrigation devices in one or more of the feedback periods of time, wherein the one or more responses indicate a presence of the irrigation devices on the multi-wire path having unique addresses matching the portion of the address to match.

22. The irrigation control unit of claim 21, wherein any irrigation device having the unique address matching the portion of the address to match is configured to respond during a given one of the feedback periods of time by drawing current from the multi-wire path during the given one of the feedback periods of time, and wherein the automated device discovery process executed by the control circuit is configured to:

detect current drawn during the given one of the feedback periods of time and interpret the current drawn as a response from an irrigation device having the unique address matching the portion of the address to match.

23. The irrigation control unit of claim 15, wherein the automated device discovery process executed by the control circuit is configured to:

determine that no responses are provided by any of the irrigation devices in response to the discovery message;

determine a next portion of the address to match; and cause the modulator to modulate data comprising a next discovery message on the output power signal, the next discovery message indicating the next portion of the address to match and prompting a response from at least one of the one or more of the irrigation devices in which the corresponding portion of the unique address matches the next portion of the address to match.

24. The irrigation control unit of claim 15, wherein the automated device discovery process executed by the control circuit is configured to cause the modulator to modulate data comprising an initial discovery message on the output power signal to be provided prior to the discovery message, the initial discovery message prompting a response from each of the irrigation devices connected to the multi-wire path.

25. The irrigation control unit of claim 24, wherein the initial discovery message prompting the response from each of the irrigation devices connected to the multi-wire path in a respective one of a plurality of feedback periods of time.

26. The irrigation control unit of claim 15, wherein the automated device discovery process ends when a complete address is matched for each of the one or more of the irrigation devices connected to the multi-wire path after multiple iterations of the discovery message being sent, each iteration indicating a respective portion of the address to match and prompting a respective response from the irrigation devices in which the corresponding portion of the unique address matches the respective portion of the address to match.

27. An irrigation control unit for use with irrigation devices connected to a multi-wire path in an irrigation system comprising:

a modulator configured to provide an output power signal modulated with data;

a multi-wire interface coupled to the modulator and configured to electrically couple to the multi-wire path extending into a landscape and to which the irrigation devices are connected, the irrigation devices each having a unique address and configured to derive operational power from the output power signal and demodulate the data; and a control circuit coupled to the modulator and configured to execute an automated device discovery process configured to:

cause the modulator to modulate the data comprising iterations of discovery messages on the output power signal, the discovery messages each indicating a respective portion of an address to match and prompting a response from one or more of the irrigation devices in which a corresponding portion of the unique address matches the respective portion of the address to match, wherein responses to each iteration of the discovery message result in a modification of the respective portion of the address to match for subsequent discovery messages, and wherein the discovery message comprises a data portion defining a number of address bits in the respective portion of the address to match and defining a value of the address bits of the respective portion of the address to match.

28. The irrigation control unit of claim 27, wherein the response from one or more of the irrigation devices indicates that the corresponding portion of the unique address matches the respective portion of the address to match.

29. The irrigation control unit of claim 27, wherein a discovery process response from the one or more of the irrigation devices occurs in a respective period of time corresponding to an additional portion of the unique address of the one or more of the irrigation devices.

30. The irrigation control unit of claim 29, wherein the response from the one or more of the irrigation devices indicates that the corresponding portion of the unique address matches the respective portion of the address to match and indicates the additional portion of the unique address of the one or more of the irrigation devices.

31. The irrigation control unit of claim 27, wherein the automated device discovery process ends when a complete address is matched for each of the one or more of the irrigation devices connected to the multi-wire path.

32. The irrigation control unit of claim 27, wherein the automated device discovery process executed by the control circuit is configured to cause the modulator to modulate data comprising an initial discovery message on the output power signal to be provided prior to the discovery message, the initial discovery message prompting a response from each of the irrigation devices connected to the multi-wire path.

33. A method for use with irrigation devices connected to a multi-wire path in an irrigation system comprising:

providing, by a modulator of the irrigation system, an output power signal modulated with data;

executing, by a control circuit of an irrigation control unit, an automated device discovery process to cause the modulator to modulate the data comprising a discovery message on the output power signal, the discovery message indicating a portion of an address to match and prompting a response from one or more of the irrigation devices in which a corresponding portion of the address matches the portion of the address to match; and providing, by the control circuit via a multi-wire interface, the modulated data over the multi-wire path that extends into a landscape and to which the irrigation devices are connected, the irrigation devices each having a unique address and configured to derive operational power from the output power signal and demodulate the data, wherein the discovery message comprises a data portion defining a number of address bits in the portion of the address to match and defining a value of the address bits of the portion of the address to match.

34. A method for use with irrigation devices connected to a multi-wire path in an irrigation system comprising:
providing, by a modulator of the irrigation system, an output power signal modulated with data;
executing, by a control circuit of an irrigation control unit, an automated device discovery process to cause the modulator to modulate the data comprising a discovery message on the output power signal, the discovery message indicating a portion of an address to match and prompting a response from one or more of the irrigation devices in which a corresponding portion of the address matches the portion of the address to match; and
providing, by the control circuit via a multi-wire interface, the modulated data over the multi-wire path that extends into a landscape and to which the irrigation devices are connected, the irrigation devices each having a unique address and configured to derive operational power from the output power signal and demodulate the data,
wherein the discovery message comprises a first data portion and a second data portion, wherein the first data portion corresponds to the portion of the address to match and the second data portion corresponds to feedback periods of time for each of one or more of the irrigation devices to respond,
wherein the first data portion defines a first set of address bits to match and a position of the first set of address bits in the address, and wherein the second data portion defines a set of feedback periods of time, each feedback period of time corresponding to a second set of address bits and a position of the second set of address bits in the address.

* * * * *